US010120952B2

(12) United States Patent
Bush et al.

(10) Patent No.: US 10,120,952 B2
(45) Date of Patent: Nov. 6, 2018

(54) SYSTEM AND METHOD FOR DEFINING APPLICATION DEFINITION FUNCTIONALITY FOR GENERAL PURPOSE WEB PRESENCES

(71) Applicant: ROGERS FAMILY TRUST, Atherton, CA (US)

(72) Inventors: Alan Bush, Redmond, WA (US); Valeriy V. Pelyushenko, San Jose, CA (US); Zahid N. Ahmed, Westborough, MA (US); Michael Galpin, San Jose, CA (US); Herbert Wayne Stiel, San Francisco, CA (US); Shashi P. Suravarapu, San Ramon, CA (US); Robert Saran Hoexter, Half Moon Bay, CA (US); Joshua Brunaugh, Sunnyvale, CA (US)

( * ) Notice: Subject to any disclaimer, the term of this patent is extended or adjusted under 35 U.S.C. 154(b) by 365 days.

(21) Appl. No.: 14/468,273

(22) Filed: Aug. 25, 2014

(65) Prior Publication Data

US 2015/0046500 A1 Feb. 12, 2015

Related U.S. Application Data

(63) Continuation of application No. 11/702,194, filed on Feb. 2, 2007, now Pat. No. 8,819,079.

(51) Int. Cl.
*G06F 7/00* (2006.01)
*G06F 17/30* (2006.01)

(52) U.S. Cl.
CPC .... *G06F 17/3089* (2013.01); *G06F 17/30528* (2013.01); *G06F 17/30923* (2013.01)

(58) Field of Classification Search
CPC ......... G06F 17/30528; G06F 17/30923; G06F 17/30089; G06F 17/30867
USPC ................ 707/803, 806, 805, 807, 999.003; 715/968
See application file for complete search history.

(56) References Cited

U.S. PATENT DOCUMENTS

| | | | | |
|---|---|---|---|---|
| 6,144,376 | A * | 11/2000 | Connelly | H04N 5/4401 348/552 |
| 6,195,651 | B1 | 2/2001 | Handel et al. | |
| 6,330,554 | B1 * | 12/2001 | Altschuler | G06Q 30/02 706/21 |
| 6,401,111 | B1 * | 6/2002 | Dan | H04L 43/00 709/204 |
| 6,643,650 | B1 | 11/2003 | Slaughter et al. | |
| 6,789,077 | B1 * | 9/2004 | Slaughter | G06F 9/465 |
| 6,985,901 | B1 * | 1/2006 | Sachse | H04L 41/5032 |

(Continued)

OTHER PUBLICATIONS

PCT/US2008/01048, International Preliminary Report on Patentability dated Aug. 4, 2009 (7 pages).

(Continued)

*Primary Examiner* — Daniel Kuddus
(74) *Attorney, Agent, or Firm* — DLA Piper LLP (US)

(57) ABSTRACT

An application specification system and method have a storage unit with an XML based schema definition for an application definition language and one or more cells with each cell having one or more components that define computational and data access aspects of an application and one or more presentations. The system and method also have a web presence that performs one or more applications that is instantiated from a cell instance that has one or more components.

16 Claims, 44 Drawing Sheets

(56) References Cited

U.S. PATENT DOCUMENTS

| | | | | |
|---|---|---|---|---|
| 6,990,480 | B1 * | 1/2006 | Burt | G06F 17/246 |
| 7,178,100 | B2 * | 2/2007 | Call | G06F 17/2247 707/999.101 |
| 7,237,184 | B2 * | 6/2007 | Ballard | G06Q 10/10 715/237 |
| 7,730,068 | B2 | 6/2010 | Sarnowicz et al. | |
| 9,241,012 | B2 * | 1/2016 | de Castro, Jr. | H04L 65/1043 |
| 9,361,396 | B2 * | 6/2016 | Fox | G06F 8/38 |
| 2003/0158832 | A1 * | 8/2003 | Sijacic | G06F 8/34 |
| 2003/0188163 | A1 * | 10/2003 | Fischer | H04L 63/08 713/170 |
| 2004/0003341 | A1 * | 1/2004 | alSafadi | G06F 17/243 715/234 |
| 2004/0098206 | A1 * | 5/2004 | Milliken | G06Q 10/087 702/31 |
| 2005/0027681 | A1 | 2/2005 | Bernstein et al. | |
| 2005/0050454 | A1 * | 3/2005 | Jennery | G06F 17/30905 715/235 |
| 2005/0091231 | A1 | 4/2005 | Pal et al. | |
| 2005/0097146 | A1 | 5/2005 | Konstantinou et al. | |
| 2006/0187048 | A1 * | 8/2006 | Curkendall | A01K 11/007 340/572.4 |
| 2007/0033209 | A1 * | 2/2007 | Magee | G06F 17/3092 |
| 2007/0073753 | A1 | 3/2007 | Baikov | |
| 2007/0112801 | A1 * | 5/2007 | McGreevy | G06Q 10/06 |
| 2007/0162456 | A1 * | 7/2007 | Agassi | G06F 17/30867 |
| 2007/0185721 | A1 * | 8/2007 | Agassi | G06Q 10/10 705/1.1 |
| 2007/0208711 | A1 * | 9/2007 | Rhoads | G06F 17/3002 |
| 2007/0209025 | A1 * | 9/2007 | Jing | G06F 17/30265 |

OTHER PUBLICATIONS

PCT/US2008/01048, International Search Report dated Jun. 24, 2008 (3 pages).

PCT/US2008/01048, Written Opinion dated Jun. 24, 2008 (6 pages).

Ludascher, et al., "A Model-Based Mediator System for Scientific Data Management," May 7, 2003 (36 pages).

* cited by examiner

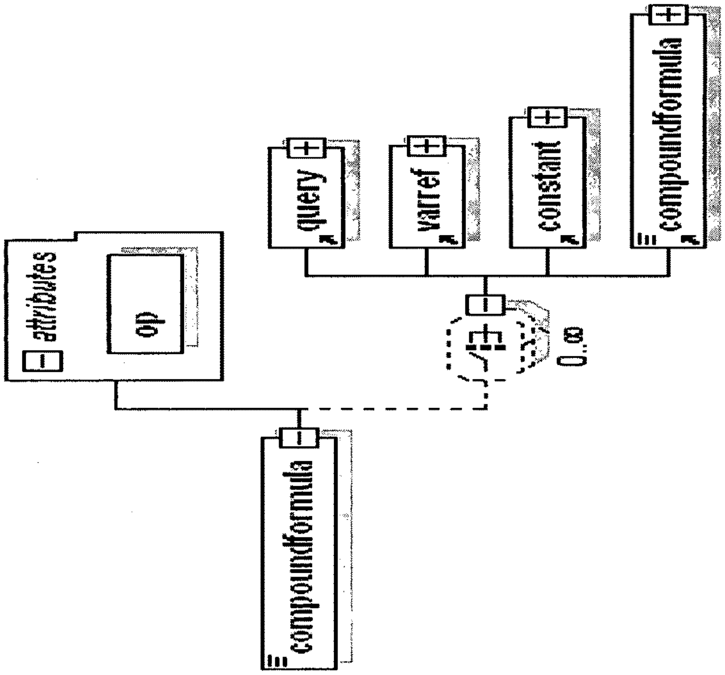
FIGURE 2D2
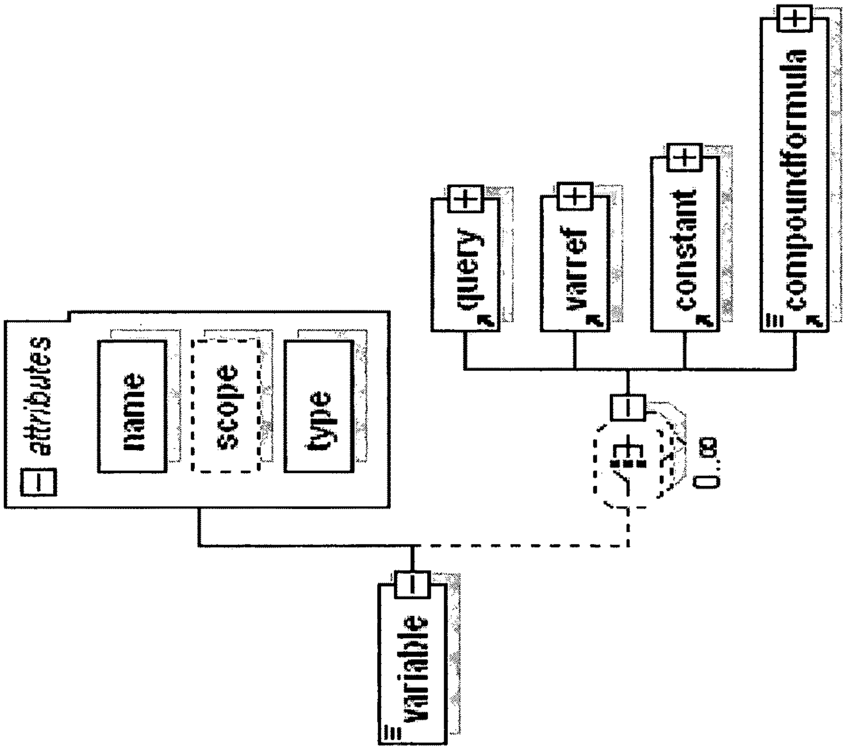
FIGURE 2D1

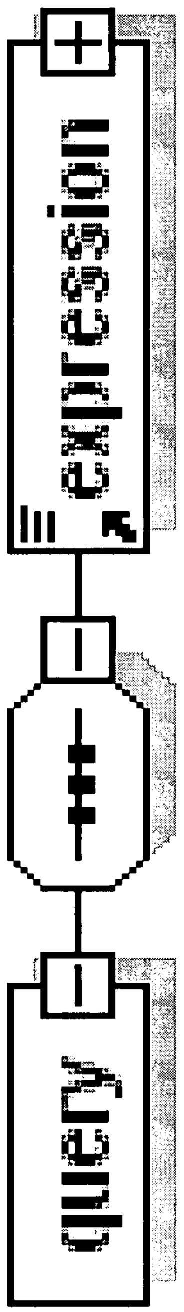
FIGURE 2E1
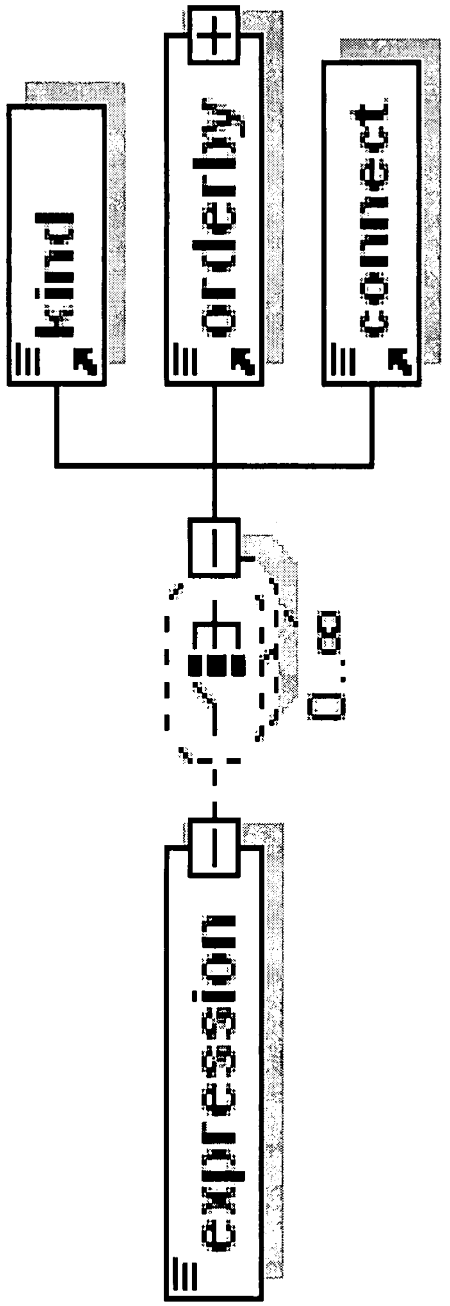
FIGURE 2E2

130

```
<?xml version="1.0" encoding="UTF-8" ?>
- <item kind="category">
  <label>Room Template Catalog</label>
  <description />
  <categorize>ROOM</categorize>
- <items>
- <item kind="catalog">
  <label>Personal Information Management Room</label>
  <description />
  <refType>ROOM</refType>
  <refId>pimRoom</refId>
  </item>
- <item kind="catalog">
  <label>Family Room</label>
  <description />
  <refType>ROOM</refType>
  <refId>familyRoom</refId>
  </item>
- <item kind="catalog">
  <label>Auto Room</label>
  <description />
  <refType>ROOM</refType>
  <refId>autoRoom</refId>
  </item>
- <item kind="catalog">
  <label>Book Room</label>
  <description />
  <refType>ROOM</refType>
  <refId>bookRoom</refId>
  </item>
- <item kind="catalog">
  <label>Movie Room</label>
  <description />
  <refType>ROOM</refType>
  <refId>movieRoom</refId>
  </item>
- <item kind="catalog">
  <label>Music Room</label>
  <description />
  <refType>ROOM</refType>
  <refId>musicRoom</refId>
  </item>
- <item kind="catalog">
  <label>Real Estate Room</label>
  <description />
  <refType>ROOM</refType>
  <refId>realEstateRoom</refId>
  </item>
- <item kind="catalog">
  <label>Restaurant Room</label>
  <description />
  <refType>ROOM</refType>
  <refId>restaurantRoom</refId>
  </item>
- <item kind="catalog">
  <label>Wine Room</label>
  <description />
  <refType>ROOM</refType>
  <refId>wineRoom</refId>
  </item>
  </items>
  </item>
```

```
<cell name="AccountCell" xmlns="http://www.ludilabs.com/al1/definition">
<!-- account level common variables -->
</cell>
```

```
<cell name="autoCell" xmlns="http://www.ludilabs.com/al1/definition">
        <variable name="roomName" scope="local" type="String"/>
        <variable name="tagFilter" scope="session" type="String"/>
        <variable name="connectedItemId" scope="session" type="Item"/>

        <component name="autos" type="AutoComponent"/>
        <component name="notes" type="NoteComponent"/>
        <component name="photos" type="PhotoComponent"/>
        <component name="links" type="LinkComponent"/>
        <component name="tagz" type="TagComponent"/>
        <component name="whatsnew" type="WhatsNewComponent"/>

        </cell>
```

```
<cell name="bookCell" xmlns="http://www.ludilabs.com/al1/definition">
        <variable name="roomName" scope="local" type="String"/>
        <variable name="tagFilter" scope="session" type="String"/>
        <variable name="connectedItemId" scope="session" type="Item"/>

        <component name="books" type="BookComponent"/>
        <component name="notes" type="NoteComponent"/>
        <component name="photos" type="PhotoComponent"/>
        <component name="links" type="LinkComponent"/>
        <component name="tagz" type="TagComponent"/>
        <component name="whatsnew" type="WhatsNewComponent"/>

</cell>
```

FIGURE 6C

```xml
<component name="AutoComponent" xmlns="http://www.ludilabs.com/al1/definition">
        <variable name="sortPath" scope="account" type="String">//*[local-name()='Attr']/*[local-name()='Make']</variable>
        <variable name="sortDirection" scope="account" type="String">asc</variable>
        <variable name="autos" type="ItemList">
                <query>
                        <expression>
                                <kind>AutoItem</kind>
                                <orderby direction="${sortDirection}">${sortPath}</orderby>
                                ${cell.tagFilter}
                        </expression>
                </query>
        </variable>
        <variable name="connectedAutos" type="ItemList">
                <query>
                        <expression>
                                <connect>${cell.connectedItemId}</connect>
                                <kind>AutoItem</kind>
                        </expression>
                </query>
        </variable>
        <action name="setSortOrder">
                <parameter name="sortPath" type="String"/>
                <parameter name="sortDirection" type="String"/>
        </action>
</component>
```

FIGURE 7A

```xml
<component name="BookComponent" xmlns="http://www.ludilabs.com/al1/definition">
        <variable name="sortPath" scope="account" type="String">//*[local-name()='ItemDetails']/*[local-name()='Title']</variable>
        <variable name="sortDirection" scope="account" type="String">asc</variable>
        <variable name="books" type="ItemList">
                <query>
                        <expression>
                                <kind>BookItem</kind>
                                <orderby direction="${sortDirection}">${sortPath}</orderby>
                                ${cell.tagFilter}
                        </expression>
                </query>
        </variable>
        <variable name="connectedBooks" type="ItemList">
                <query>
                        <expression>
                                <connect>${cell.connectedItemId}</connect>
                                <kind>BookItem</kind>
                        </expression>
                </query>
        </variable>
        <action name="setSortOrder">
                <parameter name="sortPath" type="String"/>
                <parameter name="sortDirection" type="String"/>
        </action>
</component>
```

FIGURE 7B

```
/**
public void create(DbXmlTransaction txn, DbXmlDocument document)
  throws XmlException {
 String containerName = document.getContainerName();
 String documentName = document.getDocumentName();
 XmlDocument xmlDocument = null;
 XmlUpdateContext updateContext = null;
 try {
  // create document
    xmlDocument = getXmlManager().get().createDocument();
    // set name, content
    xmlDocument.setName(documentName);
    if (document.getData() != null) {
     xmlDocument.setContent(document.getData());
    }
    // set metadata
    DbXmlMetadata metadata = document.getMetadata();
    if (metadata != null) {
     for (Map.Entry<String, String> e: metadata.getMap().entrySet()) {
      XmlValue xmlValue = new XmlValue(e.getValue());
      xmlDocument.setMetaData(METADATA_URI, e.getKey(), xmlValue);
      xmlValue.delete();
     }
    }
    // open container
    XmlContainer container;
     container = ContainerManager.openContainer(getXmlManager(), txn, containerName, true);
     updateContext = getXmlManager().get().createUpdateContext();
    // persist document
    container.putDocument(txn.get("DbXmlServiceImpl.create(DbXmlTransaction, DbXmlDocument)"), xmlDocument,
updateContext);
 } catch (XmlException xe) {
  throw xe;
 } finally {
  if (updateContext != null) updateContext.delete();
  if (xmlDocument != null) xmlDocument.delete();
 }
 }
```

FIGURE 10

```
<xs:complexType name="AbstractItemKind" abstract="true">
   <xs:sequence>
      <xs:element name="ItemDetails" type="ns:BasicItemDescriptorType"/>
   </xs:sequence>
</xs:complexType>
```

FIGURE 12

```
<xs:complexType name="BasicItemDescriptorType">
   <xs:sequence>
         <xs:element name="LogicalServerID" type="xs:string"/>
         <xs:element name="ContentSize" type="xs:integer"/>
         <xs:element name="CreatedBy" type="xs:string"/>
         <xs:element name="CreationTime" type="xs:dateTime"/>
         <xs:element name="ItemID" type="xs:string"/>
         <xs:element name="KindID" type="xs:string"/>
         <xs:element name="LastModified" type="xs:dateTime"/>
         <xs:element name="Note" type="ns:NoteType" minOccurs="0"/>
         <xs:element name="RelatedItem" type="ns:RelatedItemType" minOccurs="0"
           maxOccurs="unbounded"/>
         <xs:element name="Source" type="xs:anyURI" minOccurs="0"/>
         <xs:element name="SysConnID" type="ns:SystemConnectionIDType" minOccurs="0"/>
        <xs:element name="SysTag" type="ns:SystemTagType" minOccurs="0" maxOccurs="unbounded"/>
         <xs:element name="Title" type="xs:string" minOccurs="0"/>
         <xs:element name="UserTag" type="ns:UserTagType" minOccurs="0" maxOccurs="unbounded"/>
         <xs:element name="UpdatedBy" type="xs:string"/>
   </xs:sequence>
   <xs:attribute name="TemplateID" type="xs:long"/>
</xs:complexType>
```

FIGURE 13

```
<contactItemKind xmlns="urn:com:sharefare:webos:basecomponents-1.0"
        xmlns:ns2="urn:com:sharefare:webos:message-1.0" id="34047" kindId="28" cellId="34043" createdTime="2006-12-20T12:38:47.836-08:00"
        createdBy="32012" updatedTime="2006-12-20T12:38:48.168-08:00"updatedBy="32012">
-<ItemDetails>
        <CellID>Cell(34043)</CellID>
        <CreatedBy>32012</CreatedBy>
        <CreationTime>2006-12-20T12:38:47.836 08:00</CreationTime>
        <ItemID>Item(34047,Cell(34043))</ItemID>
        <KindID>ContactItem</KindID>
        <LastModified>2006-12-20T12:38:48.168-08:00</LastModified>
        -<RelatedItem>
                <ItemReference>Item(34045,Cell(34043))</ItemReference>
                <KindID>ContactItem</KindID>
                <RelationType>vp</RelationType>
        </RelatedItem>
        -<RelatedItem>
                <ItemReference>Item(34046,Cell(34043))</ItemReference>
                <KindID>ContactItem</KindID>
                <RelationType>child</RelationType>
        </RelatedItem>
- <SysTag>
        <Tag>LocationEmailAddressSysTag </Tag>
        <Role>EmailAddress</Role>
        <Value>./ludi:EmailAddress[@emailType="Work"]</Value>
</SysTag>
-<SysTag>
                <Tag>PersonPersonNameSysTag</Tag>
                <Role>PersonName</Role>
                <Value>./ludi:PersonName/ludi:FirstName</Value>
</SysTag>
-<SysTag>
        <Tag>CategoryOrganizationSysTag</Tag>
        <Role>Organization</Role>
        <Value>./ludi:Organization/ludi:Title</Value>
</SysTag>
```

FIGURE 14A

```
-<SysTag>
        <Tag>PersonCreatedBySysTag</Tag>
        <Role>CreatedBy</Role>
        <Value>./ludi:ItemDetails/ludi:CreatedBy</Value>
</SysTag>
-<SysTag>
        <Tag>PersonPersonLastNameSysTag</Tag>
        <Role>PersonLastName</Role>
        <Value>./ludi:PersonName/ludi:LastName</Value>
</SysTag>
-<SysTag>
        <Tag>PersonUpdatedBySysTag</Tag>
        <Role>UpdatedBy</Role>
        <Value>./ludi:ItemDetails/ludi:UpdatedBy</Value>
</SysTag>
-<SysTag>
        <Tag>LocationEmailHomeAddressSysTag</Tag>
        <Role>EmailHomeAddress</Role>
        <Value>./ludi:EmailAddress[@emailType="Home"]</Value>
</SysTag>
-<SysTag>
        <Tag>MESSAGE</Tag>
        <Role>TYPE</Role>
        <Value>INBOX</Value>
</SysTag>
-<UserTag>
        <Tag>Hello</Tag>
</UserTag>
-<UserTag>
        <Tag>There</Tag>
-</UserTag>
        <UpdatedBy>32012</UpdatedBy>
        </ItemDetails>
                <EmailAddress><Email>herb@sharefare.com</Email></EmailAd
                dress>
                <PersonName><FirstName>herb</FirstName><LasAtName>stiel<
                /LastName></PersonName></contactItemKind>
</UserTag>
```

FIGURE 14B

```
- <photoKind xmlns="urn:com:sharefare:webos:basecomponents-1.0" xmlns:ns2="urn:com:sharefare:webos:message-1.0" ContentType="image/jpeg" id="30001" kindId="26" cellId="30000" createdTime="2006-12-20T12:32:15.156-08:00" createdBy="1" updatedTime="2006-12-20T12:32:15.613-08:00" updatedBy="1">
- <ItemDetails>
      <CellID>Cell(30000)</CellID>
      <ContentSize>67425</ContentSize>
      <CreatedBy>1</CreatedBy>
      <CreationTime>2006-12-20T12:32:15.156-08:00</CreationTime>
      <ItemID>Item(30001,Cell(30000))</ItemID>
      <FileServerID>Server(901)</FileServerID>
      <KindID>PhotoItem</KindID>
      <LastModified>2006-12-20T12:32:15.613-08:00</LastModified>
- <SysTag>
      <Tag>CategoryContentTypeSysTag</Tag>
      <Role>ContentType</Role>
      <Value>./@ContentType</Value>
</SysTag>
- <SysTag>
      <Tag>CategoryDescriptionSysTag</Tag>
      <Role>Description</Role>
      <Value>./ludi:Description</Value>
</SysTag>
- <SysTag>
      <Tag>PersonCreatedBySysTag</Tag>
      <Role>CreatedBy</Role>
      <Value>./ludi:ItemDetails/ludi:CreatedBy</Value>
</SysTag>
- <SysTag>
      <Tag>PersonUpdatedBySysTag</Tag>
      <Role>UpdatedBy</Role>
      <Value>./ludi:ItemDetails/ludi:UpdatedBy</Value>
</SysTag>
```

FIGURE 15A

```
- <SysTag>
      <Tag>CategoryTitleSysTag</Tag>
      <Role>Title</Role>
      <Value>./ludi:ItemDetails/ludi:Title</Value>
</SysTag>
<Title>testPhoto.jpg</Title>
      <UpdatedBy>1</UpdatedBy>
      </ItemDetails>
            <Content>http://files.sharefare.com:8080/moon/0/0/30000/testPhoto.jpg?30001-0</Content>
            <Length>0</Length>
            <Height>500</Height>
            <Size>1889</Size>
- <Summary>
      <Content>http://files.sharefare.com:8080/moon/0/0/30000/testPhoto_195x180.jpg?30001-1</Content>
      <Length>0</Length>
      <Size>11774</Size>
      <Width>195</Width>
      <Height>180</Height>
</Summary>
- <Thumbnail>
      <Content>http://files.sharefare.com:8080/moon/0/0/30000/testPhoto_65x60.jpg?30001-2</Content>
      <Length>0</Length>
      <Size>2340</Size>
      <Width>65</Width>
      <Height>60</Height>
</Thumbnail>
<Width>543</Width>
</photoKind>
```

FIGURE 15B

```
- <bookKind xmlns="urn:com:sharefare:webos:basecomponents-1.0" xmlns:ns2="urn:com:sharefare:webos:message-1.0"
id="29006" kindId="37" cellId="29001" createdTime="2006-12-20T12:30:39.152-08:00" createdBy="26000"
updatedTime="2006-12-20T12:30:39.152-08:00" updatedBy="26000">
- <ItemDetails>
        <CellID>Cell(29001)</CellID>
        <CreatedBy>26000</CreatedBy>
        <CreationTime>2006-12-20T12:30:39.152-08:00</CreationTime>
        <ItemID>Item(29006,Cell(29001))</ItemID>
        <KindID>BookItem</KindID>
        <LastModified>2006-12-20T12:30:39.152-08:00</LastModified>
- <SysTag>
        <Tag>CategoryDescriptionSysTag</Tag>
        <Role>Description</Role>
        <Value>./ludi:Description</Value>
</SysTag>
- <SysTag>
        <Tag>PersonAuthorSysTag</Tag>
        <Role>Author</Role>
        <Value>./ludi:Attr/Author</Value>
</SysTag>
- <SysTag>
        <Tag>CategoryBookKind/Attr/ludi:GenreSysTag</Tag>
        <Role>BookKind/Attr/ludi:Genre</Role>
        <Value>./ludi:Attr/ludi:Genre</Value>
</SysTag>
- <SysTag>
        <Tag>PersonCreatedBySysTag</Tag>
        <Role>CreatedBy</Role>
        <Value>./ludi:ItemDetails/ludi:CreatedBy</Value>
</SysTag>
```

FIGURE 16A

```
- <SysTag>
      <Tag>PersonUpdatedBySysTag</Tag>
      <Role>UpdatedBy</Role>
      <Value>./ludi:ItemDetails/ludi:UpdatedBy</Value>
</SysTag>
- <SysTag>
      <Tag>CategoryTitleSysTag</Tag>
      <Role>Title</Role>
      <Value>./ludi:ItemDetails/ludi:Title</Value>
</SysTag>
      <Title>The Haunted House</Title>
      <UpdatedBy>26000</UpdatedBy>
      </ItemDetails>
      <Description>This is a suspense book</Description>
      - <ImageArray>
      <Image>http://www.borders.com</Image>
      <Image>http://www.bn.com</Image>
      </ImageArray>
      - <Attr>
      <Author>Josh B</Author>
      <Genre>sespense</Genre>
      <ISBN>43473247347239</ISBN>
      <Year>2006</Year>
      </Attr>
</bookKind>
```

FIGURE 16B

- <autoKind xmlns="urn:com:sharefare:webos:basecomponents-1.0" xmlns:ns2="urn:com:sharefare:webos:message-1.0" id="25006" kindId="36" cellId="25001" createdTime="2006-12-20T12:29:15.959-08:00" createdBy="22000" updatedTime="2006-12-20T12:29:15.959-08:00" updatedBy="22000">
- <ItemDetails>
<CellID>Cell(25001)</CellID>
<CreatedBy>22000</CreatedBy>
<CreationTime>2006-12-20T12:29:15.959-08:00</CreationTime>
<ItemID>Item(25006,Cell(25001))</ItemID>
<KindID>AutoItem</KindID>
<LastModified>2006-12-20T12:29:15.959-08:00</LastModified>
- <SysTag>
<Tag>CategoryModelSysTag</Tag>
<Role>Model</Role>
<Value>./ludi:Attr/ludi:Model</Value>
</SysTag>
- <SysTag>
<Tag>CategoryDescriptionSysTag</Tag>
<Role>Description</Role>
<Value>./ludi:Description</Value>
</SysTag>
- <SysTag>
<Tag>CategoryGenreSysTag</Tag>
<Role>Genre</Role>
<Value>./ludi:Genre</Value>
</SysTag>

FIGURE 17A

```
- <SysTag>
      <Tag>CategoryMakeSysTag</Tag>
      <Role>Make</Role>
      <Value>./ludi:Attr/ludi:Make</Value>
</SysTag>
<UpdatedBy>22000</UpdatedBy>
</ItemDetails>
      <Description>This is a good car</Description>
      - <ImageArray>
      <Image>http://www.carsdirect.com/image.jpg</Im
      age>
      <Image>http://www.auto.com/image.jpg</Image>
      </ImageArray>
      - <Attr>
      <Make>Honda</Make>
      <Model>Accord</Model>
      <Genre>sedan</Genre>
      <MSRP>25000</MSRP>
      <MPG>27</MPG>
      </Attr>
</autoKind>
```

FIGURE 17B

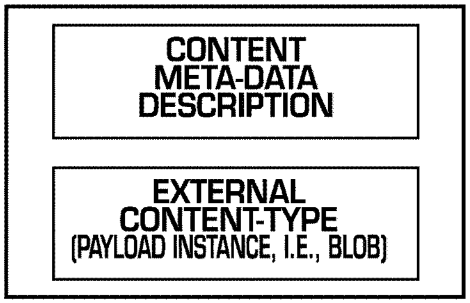

FIGURE 18A

```
<xs:complexType name="BinaryDocumentKind">
  <xs:complexContent>
    <xs:extension base="ns:AbstractDocumentKind">
      <xs:sequence>
        <xs:element name="Content" type="ct:BinaryContentReferenceType">
          <xs:annotation>
            <xs:documentation>
              This element refers to the location where some content stored in a binary format is available. The content file extension, character set code
              and encoding format can be specified as optional attributes, if needed, of the content that is being referenced.
            </xs:documentation>
          </xs:annotation>
        </xs:element>
      </xs:sequence>
      <xs:attribute name="ContentType" type="ns:MimeTypeCodeList"/>
    </xs:extension>
  </xs:complexContent>
</xs:complexType>
```

FIGURE 18B

| Kind Type | Format/File extension | Mime-type |
|---|---|---|
| EmailKind | .mbox, .pst, .eml, .csv (Tab-delimited) | |
| CalendarKind | .ics<br>.vcs | text/calendar |
| ContactKind | .vcard 3.0 (RFC 2426)<br>.vcf | text/directory |
| BinaryDocumentKind | .doc<br>.pdf<br>.ppt<br>.xls | application/word<br>application/pdf<br>application/mspowerpoint<br>application/xls, msexcel |
| PhotoKind | .jpg<br>.bmp<br>.gif<br>.png, .tiff, .pdf, .eps | image/jpeg<br>image/bmp<br>image/gif |
| AudioKind | .mp3, .mpa, .aac, .aif, .ra, .ram, .wav, .wma | audio/x-mpeg |
| VideoKind | .mov, .avi, .mp4, .qt, .rm, .swf, .wmv, .asf | video/mpeg |

FIGURE 19

```
<xs:complexType name="SystemTagType">
  <xs:annotation>
    <xs:documentation>
       This defines the system-level tag structure which are
       automatically generated for an item by the system. This
       type is used to instantiate one or more system-level
       tag elements within the ItemDetails child element in the
       AbstractItemKind.
    </xs:documentation>
  </xs:annotation>
 <xs:complexContent>
  <xs:extension base="ns:AbstractTagType">
    <xs:sequence>
     <xs:element name="ParentKindID" type="xs:string"/>
     <xs:element name="Role" type="xs:string"/>
     <xs:element name="Value" type="xs:string"/>
    </xs:sequence>
  </xs:extension>
 </xs:complexContent>
</xs:complexType>
```

FIGURE 20A

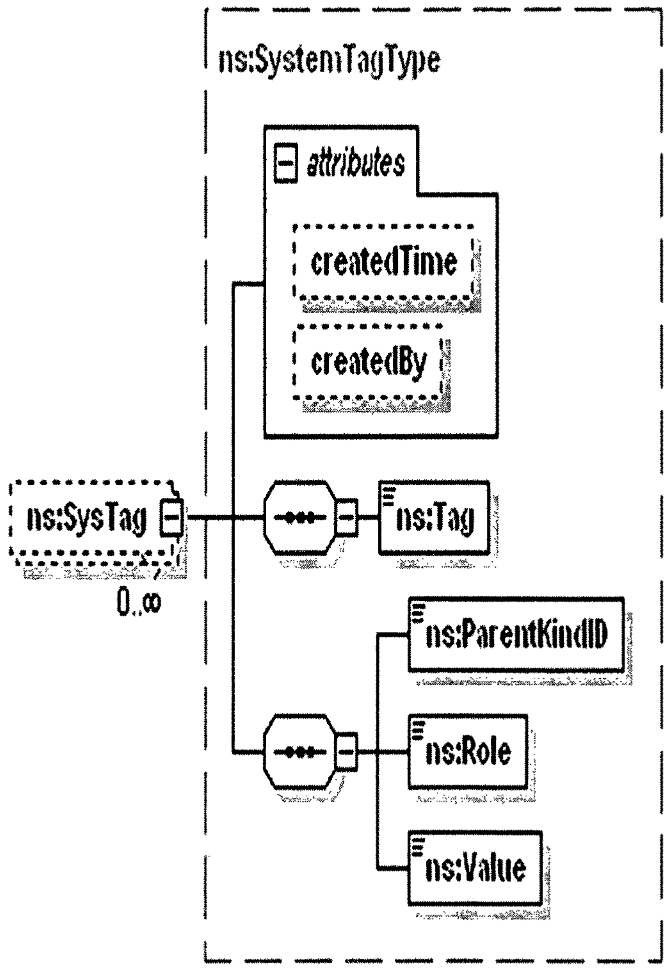

FIGURE 20B

| System Tag Type | Roles | Purpose |
|---|---|---|
| Time | Creation_time<br>Modified_time | Find an item based on when the item was created or modified? |
| Person | Owner/Creator, Source, Artist | Find an item based on who owns/created or published item? |
| Location | URI, City, Zipcode, Geo | Find an item based on where the item located? |
| Category | Org, Genre | Find an item based on some general concept or classification scheme that is associated with the item |
| Rating | Feedback_Rating, Movie_Rating, Reputation, Recommendation | Find an item based on ratings that may be associated with an item which are defined by a community or an entity |

FIGURE 20C

| System Tag | Roles | Purpose |
|---|---|---|
| **Time** | Creation_time<br>Modified_time | Find by when the item was created or modified? |
| **Person** | PersonName<br>CreatedBy<br>UpdatedBy | Find by Person Name for which this contact is or by CreatedBy (i.e., person name that created the contact item) or UpdatedBy (i.e., person name that updated contact item). |
| **Location** | EmailAddress<br>Address/CityName<br>Source | Find by EmailAddress<br>Find by Address/CityName |
| **Category** | Organization | Find by Organization. |
| **Rating** | NA | Not needed for this item kind |

FIGURE 20D

- <SysConnID>
  - The parent item and all the child items that are system connected to the parent item must include a unique identifier (specified by the SysConnID) for the system connection.

- <Source>
  - All items below the parent (i.e., contained child items such as attachments in emails) must include a Source element which represents the email address or other unique identifier used to identify the source of the parent item.
    - E.g., for an email message, the value of the source would be extracted from the contact item generated from the "From:" field in the email header
    - The format of the source will be a URI [Transport_Type]:[ID]
      - Transport_Type = {Email, RSS,..}
      - ID = {Email address of the source, username of the source, URL of the RSS data feed, etc.}

- <SysConnID> and <Source> will be added in all child items connected to the parent item as well as the parent item
  - All attachment-oriented or communication- or stream-oriented item instances (e.g a JPEG attachment that results in a Photo item from an Email message instance).

FIGURE 21

```
<xs:complexType name="RelatedItemType">
 <xs:annotation>
  <xs:documentation>
    Item will refer to related items via the
    connection relationship mechanism
    Item relationships will be specified via
    ns:RelatedItemType which describes
    1) Item Reference which is a URI
    2) Relation Type which will be a user-defi
       tag to describe the type of relation betv
       two item kind instances
  </xs:documentation>
 </xs:annotation>
 <xs:sequence>
   <xs:element name="ItemReference"
    type="xs:anyURI"/>
   <xs:element name="KindID" type="xs:stri
   <xs:element name="RelationType"
    type="xs:string" minOccurs="0"/>
 </xs:sequence>
</xs:complexType>
```

FIGURE 22A

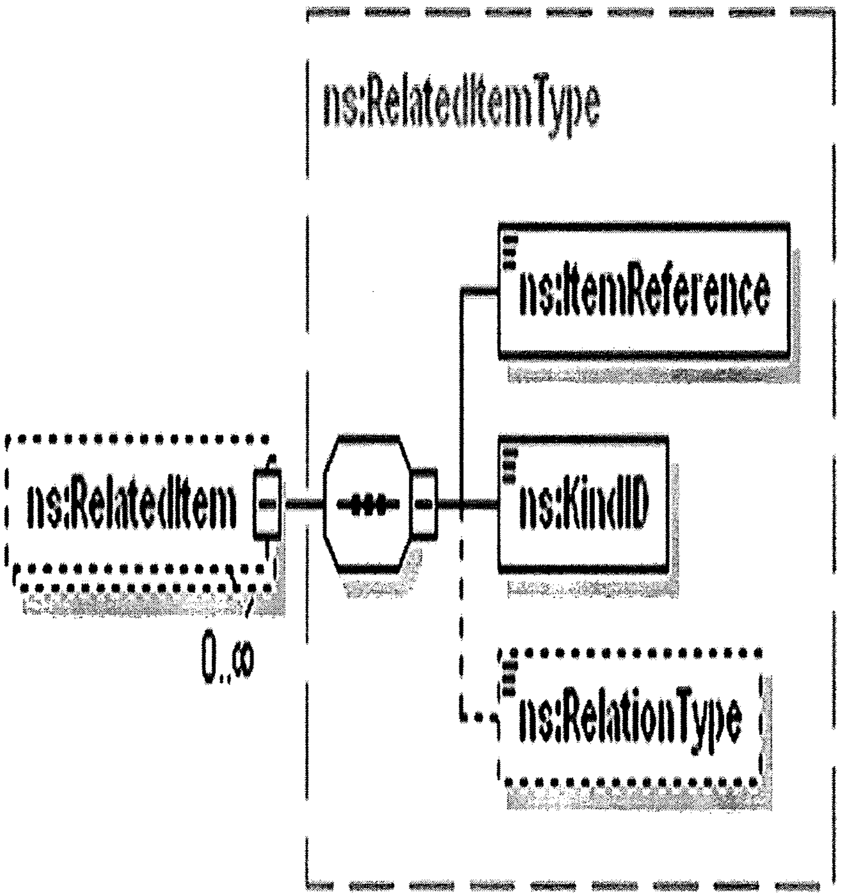

FIGURE 22B

```xml
<component name="ContactComponent"  xmlns="http://www.ludilabs.com/al1/definition">
        <variable name="sortPath" scope="account" type="String">//*[local-name()="PersonName"]/*[local-
name()="LastName"]</variable>
        <variable name="sortDirection" scope="account" type="String">asc</variable>
        <variable name="contacts" type="ItemList">
                <query>
                        <expression>
                                <kind>ContactItem</kind>
                                <orderby direction="${sortDirection}">${sortPath}</orderby>
                                ${cell.tagFilter}
                        </expression>
                </query>
        </variable>
        <variable name="connectedContacts" type="ItemList">
                <query>
                        <expression>
                                <connect>${cell.connectedItemId}</connect>
                                <kind>ContactItem</kind>
                        </expression>
                </query>
        </variable>
        <action name="setSortOrder">
                <parameter name="sortPath" type="String"/>
                <parameter name="sortDirection" type="String"/>
        </action>
</component>
```

FIGURE 23

```
declare ordering unordered; declare namespace ludi = "urn:com:sharefare:webos:basecomponents-1.0";
text { for $i in collection("15001.dbxml")
where $i//ludi:ItemDetails/ludi:KindID="ContactItem"
order by $i//*[local-name()="PersonName"]/*[local-name()="LastName"] descending
return dbxml:metadata("dbxml:name", $i) }>
```

FIGURE 24A

```
declare ordering unordered; declare namespace ludi = "urn:com:sharefare:webos:basecomponents-1.0";
text { for $i in collection("15003.dbxml")
where (
 $i//ludi:ItemDetails/ludi:ItemID!="Item(24000,Cell(15001))" and
 (
  $i//ludi:ItemDetails/ludi:RelatedItem/ludi:ItemReference="Item(24000,Cell(15001))" or
  $i//ludi:ItemDetails/ludi:Source="Item(24000,Cell(15001))" or
  $i//ludi:ItemDetails/ludi:ItemID =
   (
    for $i in collection("15003.dbxml")
    where $i//ludi:ItemDetails/ludi:ItemID="Item(24000,Cell(15001))"
    return $i//ludi:ItemDetails/ludi:Source
   ) or
  (
   $i//ludi:ItemDetails/ludi:SysConnID/ludi:ID and
   $i//ludi:ItemDetails/ludi:SysConnID/ludi:ID=
   (
    for $i in collection("15003.dbxml")
    where $i//ludi:ItemDetails/ludi:ItemID="Item(24000,Cell(15001))"
    return $i//ludi:ItemDetails/ludi:SysConnID/ludi:ID
   )
  )
 )
)
 and $i//ludi:ItemDetails/ludi:KindID="ContactItem"
return dbxml:metadata("dbxml:name", $i) }>
```

FIGURE 24B

Query consist of:
- scope declaration sc;
- query expression expr;

Query is evaluated relative to a cell c;

Specification of Operation Scope (sc, c)
- Inputs: scope declaration sc and a cell instance c
- Output: returns a set of cells which is the value of that scope declaration sc Specification of Operation Evaluation (expr, c)
- Inputs: expression expr and a cell instance c
- Output: returns all items in c matching expr Result of Query <sc, expr> evaluated at cell c is as follows:

$$\bigcup \{\textbf{cell } x \in \textbf{Scope (sc, c)} \mid \textbf{Evaluation (expr, x)}\}$$

FIGURE 26

SYSTEM AND METHOD FOR DEFINING APPLICATION DEFINITION FUNCTIONALITY FOR GENERAL PURPOSE WEB PRESENCES

PRIORITY CLAIMS/RELATED CASES

This application is a continuation of and claims priority under 35 USC 120 to U.S. patent application Ser. No. 11/702,194 filed on Feb. 2, 2007 and entitled "System And Method For Defining Application Definition Functionality For General Purpose Web Presences", the entirety of which is incorporated by reference herein.

APPENDICES

Appendix A (46 pages) is a listing of the base component and types of an exemplary embodiment of the information model (using a Universal Item Description Language described below) and forms part of the specification.

Appendix B (7 pages) is an exemplary Application Definition Language (ADL) extended markup language (XML) schema definition (XSD).

FIELD OF THE INVENTION

A method of defining application definition functionality for general purpose web presences, such as web sites and web services, is provided.

BACKGROUND

Currently it is a difficult and costly process to develop, re-use, share and modify interactive web applications that take advantage of local and remote services and functions in context of general purpose web sites. Typically a web site development process requires that the web site builder develop the application (that will be employed by the pages served by the web site) using some programming language, such as PHP which is a common language amongst web site and internet application programmers, that typically implement the presentation logic, application logic and data access logic in a monolithic program. Although rapid prototyping and deployment of application may be possible for some programmers, it would be time consuming for non-programmers to develop interactive web applications and components. This is a major limiting factor in supporting mass development, customization, revision, and re-use of web application and components and also a major limiting factor in the design, building and re-use of web sites that host pages that have embedded in them various web components that invoke web accessible applications and services on a web site.

Non-programmers who want to build web sites that hosts various kinds of applications (for example, a blogging web site, or a photo sharing web site, or an event planning web site) require a different approach of developing web applications and web sites where they can define applications using an approach of what (it does) and not how (it does) style. This approach will further help web site builders to develop and deploy applications by decoupling the computational aspects from the user interface (UI) aspects of defining applications.

Thus, it is desirable to provide a system and method for defining application functionality for general purpose web presences, such as web sites and web services, and their related run-time computational processes including integration of remote and local services and other functions, in the context of an abstract web site model which enables a web presence of any kind of application which is referenced by one or more pages served by the web site for a particular purpose. It is also desirable to provide a language that can be used to express the computational and application logic aspects of a web accessible applications and services that will allow developers to describe applications in a declarative and non-procedural way as possible and it is to this end that the present invention is directed.

BRIEF DESCRIPTION OF THE DRAWINGS

FIGS. 2D1 and 2D2 illustrate an example of a variable object model that is part of the application definition language portion of the abstract web presence model;

FIGS. 2E1 and 2E2 illustrate an example of a situated query object model that is part of the application definition language portion of the abstract web presence model;

FIG. 4 illustrates an example of the code used to implement a web presence template catalog;

FIGS. 6A-C are examples of code for an account cell, an auto cell and a book cell for the auto and book web presences shown in FIGS. 5A and 5B;

FIGS. 7A and 7B are examples of the code for an auto component and a book component of the for the auto and book web presences shown in FIGS. 5A and 5B;

FIG. 10 illustrates an example of a piece of Java code that can be invoked to create an item instance in a dedicated database container (for a particular cell instance) that can store a collection of XML document instances of any XML type is shown in FIG. 9;

FIG. 12 an exemplary implementation of a data structure for an AbstractItemKind;

FIG. 13 illustrates an example definition of BasicItemDescriptorType used to describe the <ItemDetails> child element included in an AbstractItemKind;

FIGS. 14A and 14B illustrate an example of a Contact item;

FIGS. 15A and 15B illustrate an example of a Photo item;

FIGS. 16A and 16B illustrate an example of a Book item;

FIGS. 17A and 17B illustrate an example of an Auto item;

FIGS. 18A and 18B illustrate an external content model;

FIG. 19 illustrates examples of the content kinds encapsulated using the Universal Item Information Model;

FIGS. 20A-20D illustrate further details of the system tag shown in FIG. 13;

FIG. 21 illustrates further details of the system defined connections shown in FIG. 13;

FIGS. 22A and 22B illustrate further details of the user defined connections shown in FIG. 13

FIG. 23 illustrates an example specification of application component that can process Contact items;

FIG. 24A illustrates a set of code for the query to fetch all of the ContactItems in a sorted order;

FIG. 24B illustrates a set of code for the query to fetch all of the connectedContacts for the ContactItem shown in FIG. 14;

FIG. 26 illustrates the specification of a situated query having a scope declaration (sc) and a query expression (expr) and the query is evaluated related to a cell (c).

DETAILED DESCRIPTION OF AN EMBODIMENT

Figure 1A:
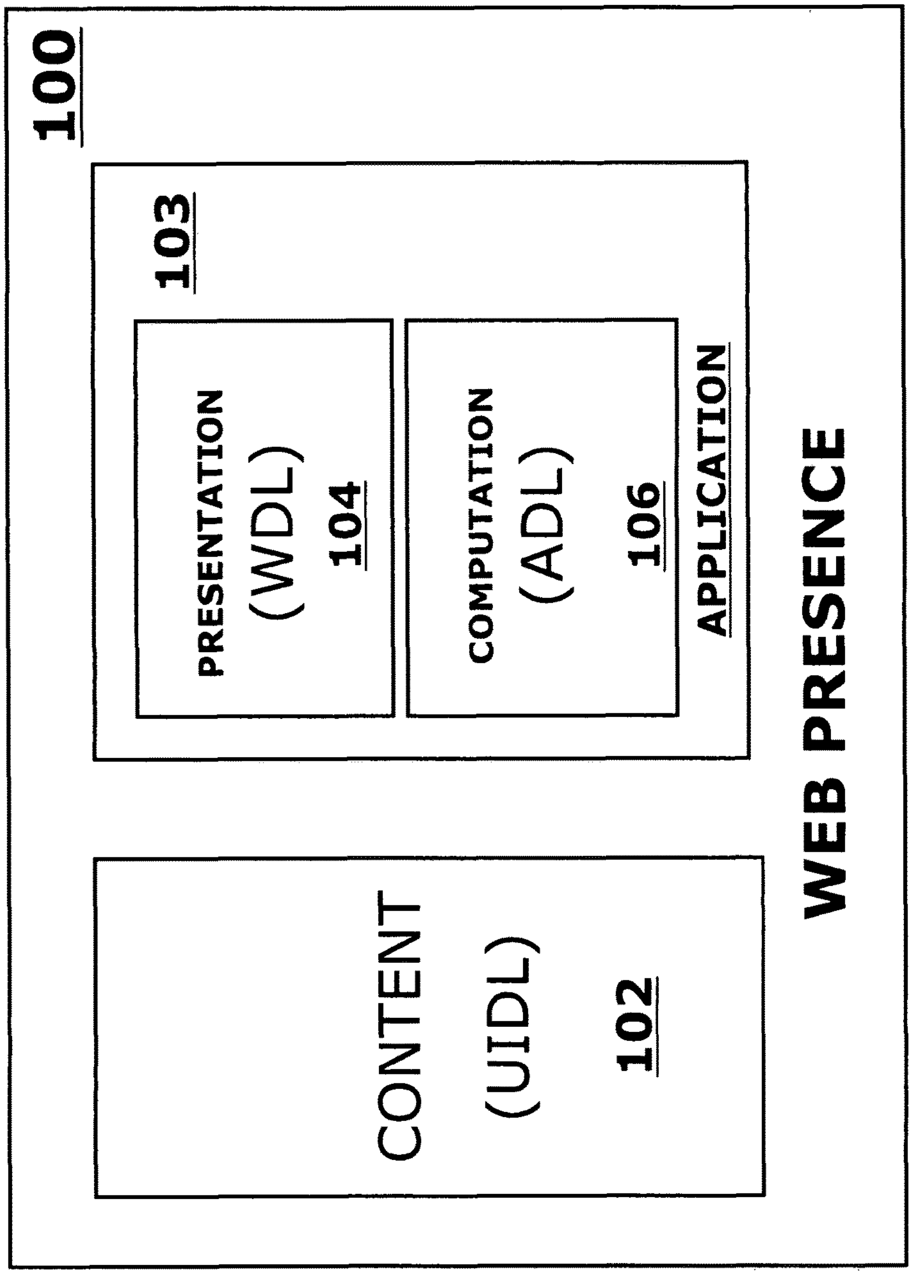
FIG. 1A illustrates an abstract model for a web presence that uses an application definition language to define the computational aspects of the web presence.

The invention is particularly applicable to a XML-based application specification system and method that uses a Universal Item Information Model (UIIM) and it is in this context that the system and method will be described. It will be appreciated, however, that the application specification system and method may use other types of information that are not specifically stored in the described Universal Item Information Model and may be implemented using languages and schema other than XML.

A web presence may include a web site, one or more web pages or a web service. The web site may consist of set of data that can be accessed for particular context and a set of applications. The Application Definition Language will be used to define the applications and components that can be hosted on a web presence, such as the web site, and made accessible via the pages that are served by the web site (and which reference the application and its components running on the web server of the web site). Hence, an abstract model of a web presence would be that consists of set of data together with the applications. All data of any type managed by an abstract web presence can be described using the Universal Item Description Language (UIDL) and the applications and its sub-components that process and access the data can be described in Application Description Language (ADL). The applications, which may exploit local and remote services and functions, are presented to the user via user interfaces or some web pages. There are many commercial and public domain tools to create the web pages, but it is difficult for a user who is a non-programmer to define applications that run on a web site with the data that is needed for the user's purpose of the web site.

While web presence consists of both presentation and application logic components (described below), the ADL defines the application and its related computational processes and dependent non-user facing interfaces. The non-user facing interfaces can be invoked by application components using remote or local procedure calls for example via Java API calls, Javascript object invocations, and other standard web services API invocation method using SOAP/WSDL or REST-style HTTP interfaces.

Furthermore, a typical application or component of an application consist of definitions of application variables, definitions of queries to access local and remote data, definitions of events, definitions of subscription of events, and definitions of actions which are carried out by the invocation of local and remote APIs as described above. By specifying the computational aspects of application and its components using the Application Definition Language (ADL), a user can design applications that can be made accessible via web site independent of the presentation requirement of the client.

The system and method for defining application definition functionality for general purpose web presences (using an Application Definition Language (ADL)) may be implemented, in an exemplary embodiment, using the known XML language with a corresponding ADL XML Schema definition (XSD) which is attached as Appendix B and forms part of this specification. The XSD is merely illustrative since the ADL may be implemented using other XSDs and may be implemented in languages other than XML. The ADL may be used to define an application using one or more cells (described below) and one or more components in a standardized language, such as a XML-based language. The XSD definition of the cells and the components may be used to enable the consistent definition of cells and components and allow third party application developers to use various known plug-ins to develop new web applications running in third party systems.

FIG. 1A illustrates an abstract model for a web presence 100 that uses an application definition language to define the computational aspects of the web presence. The ADL provides a model/method for defining application functionality for generic web presences. The web presence defined partially by the ADL may include a presence that has a user visual interface portion (such as a web page or a web site) or an application that performs computations, but does not provide a visual user interface, such as a web services. Thus, the model for the web presence may include one or more pieces of content 102 (defined using the UIDL described below) and one or more applications 103 that provide functionality to the web presence. Each application is a declarative, non-procedural definition to a particular functionality that can be part of the web presence. Each application may further comprise a presentation portion 104 (defined using WDL) and a computation portion 106 (defined using the ADL). ADL provides a framework to define the various computational aspects of the web presence while the WDL defines the presentation aspects of the web presence (and makes the application visible to a user) and the WDL is described in more detail in a co-pending patent application.

Figure 1B:
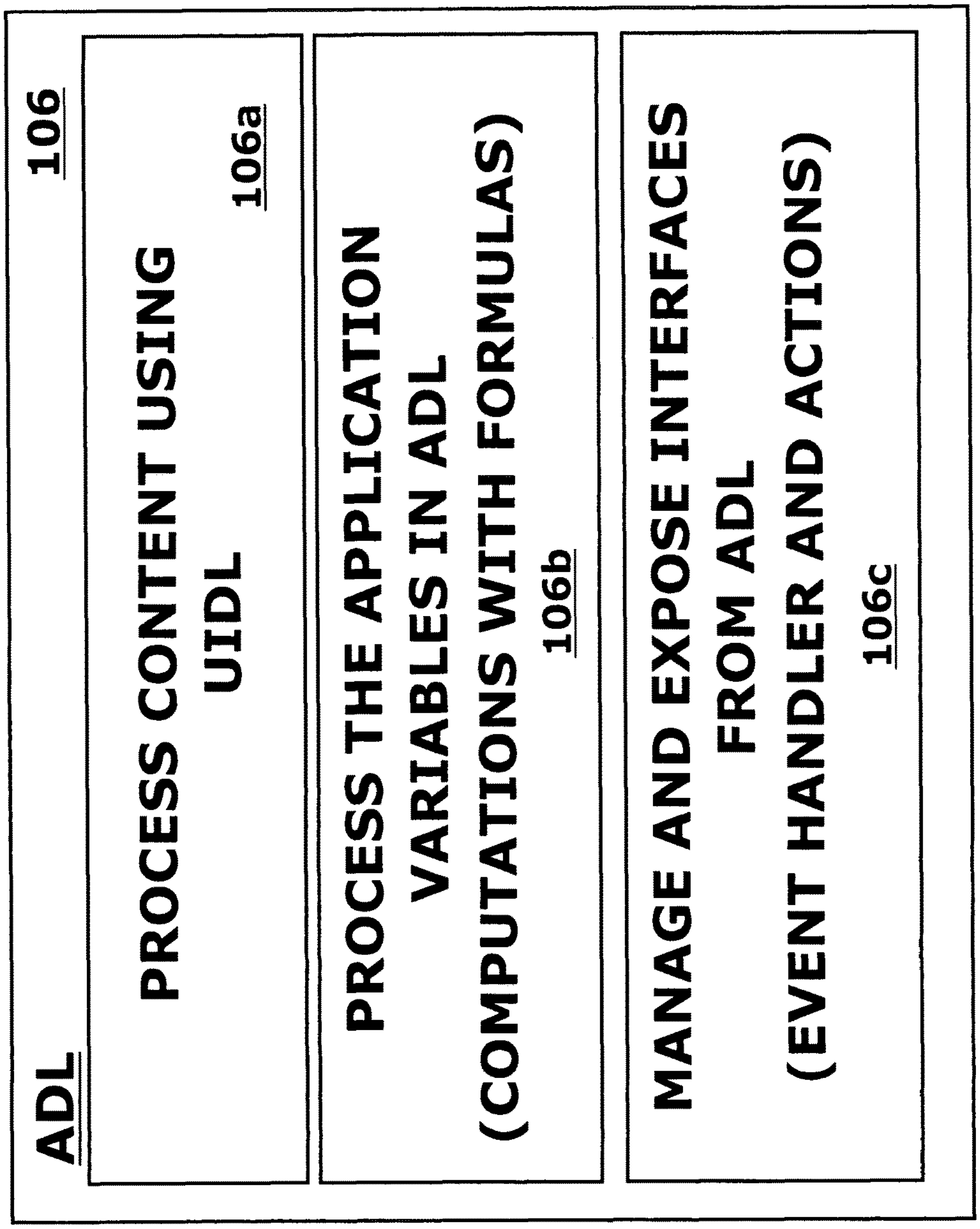
FIG. 1B illustrates further details of the application definition language portion of the abstract web presence model in FIG. 1A.

FIG. 1B illustrates further details of the application definition language portion of the abstract web presence model in FIG. 1A. The computation portion 106 of each application may perform one or more functions including processing the content using the UIDL (106*a*), process the variables of the application (described below) in the ADL using computations with formulas (106*b*) and manage and expose interfaces from the ADL using event handlers and actions (described below). Each of these functions defined by the ADL are described below in more detail.

Figure 2A:
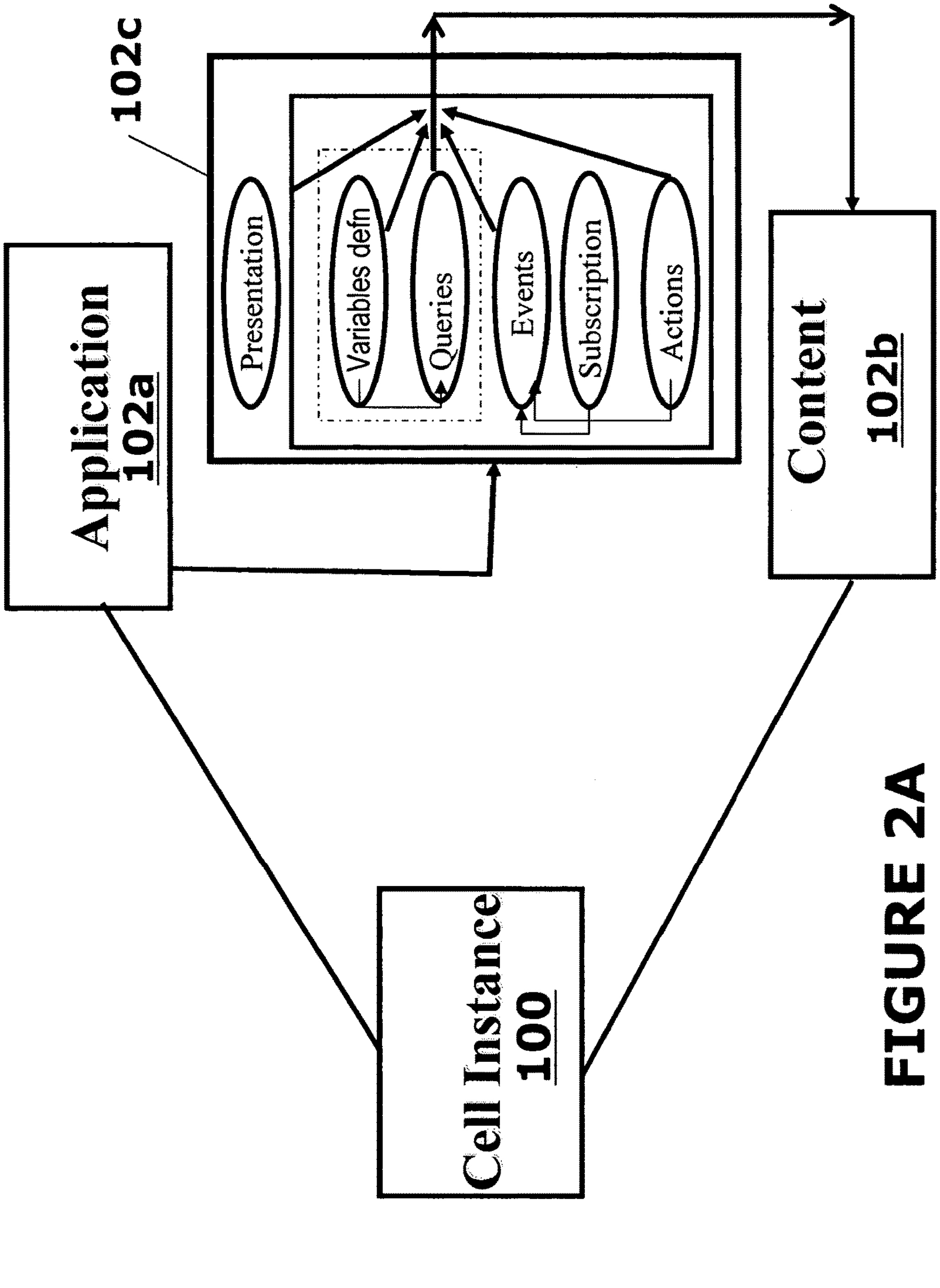
FIG. 2A illustrates an example of a cell instance model of the application definition language portion of the abstract web presence model in FIG. 1A.

FIG. 2A illustrates an example of a cell instance model of the application definition language portion of the abstract web presence model in FIG. 1A. In particular, FIG. 1 illustrates a cell instance 100. The cell instance 100 may include an application 102*a* and content 102*b* that may include pieces of content item and variable values and variable pieces of content. Thus, each cell instance may include both the one or more application components to provide various operations and functions 102*c* as well as the content associated with the applications. The operations and functions 102*c* may include, for example, a presentation component (to display the user interface via web page served by a web site's server) and application component. The application component may include zero or more variable definitions (described below in more detail), zero or more queries that are used to define variables (described below in more detail), zero or more event definitions that are produced and consumed by application components, zero or more subscriptions to events (described below in more detail), and one or more actions (described below in more detail). The action in the cell instance may invoke a Java method on a local object in web page, a local object on the application component, a remote procedure call via standard web services API calls using SOAP/WSDL or REST-style interfaces. The processing of actions may also raise additional events which are consumed by other components that subscribe to those events. The cell instance which may consist of one or more application sub-components when exposed to a web client can be considered as a packaged web application in that it contains the application, its related application components as well as the data/content associated with the application that may be stored in a database contained within the cell instance. Now, an application component object model that is part of the application definition language portion of the abstract web presence model is described in more detail.

Figure 2B:
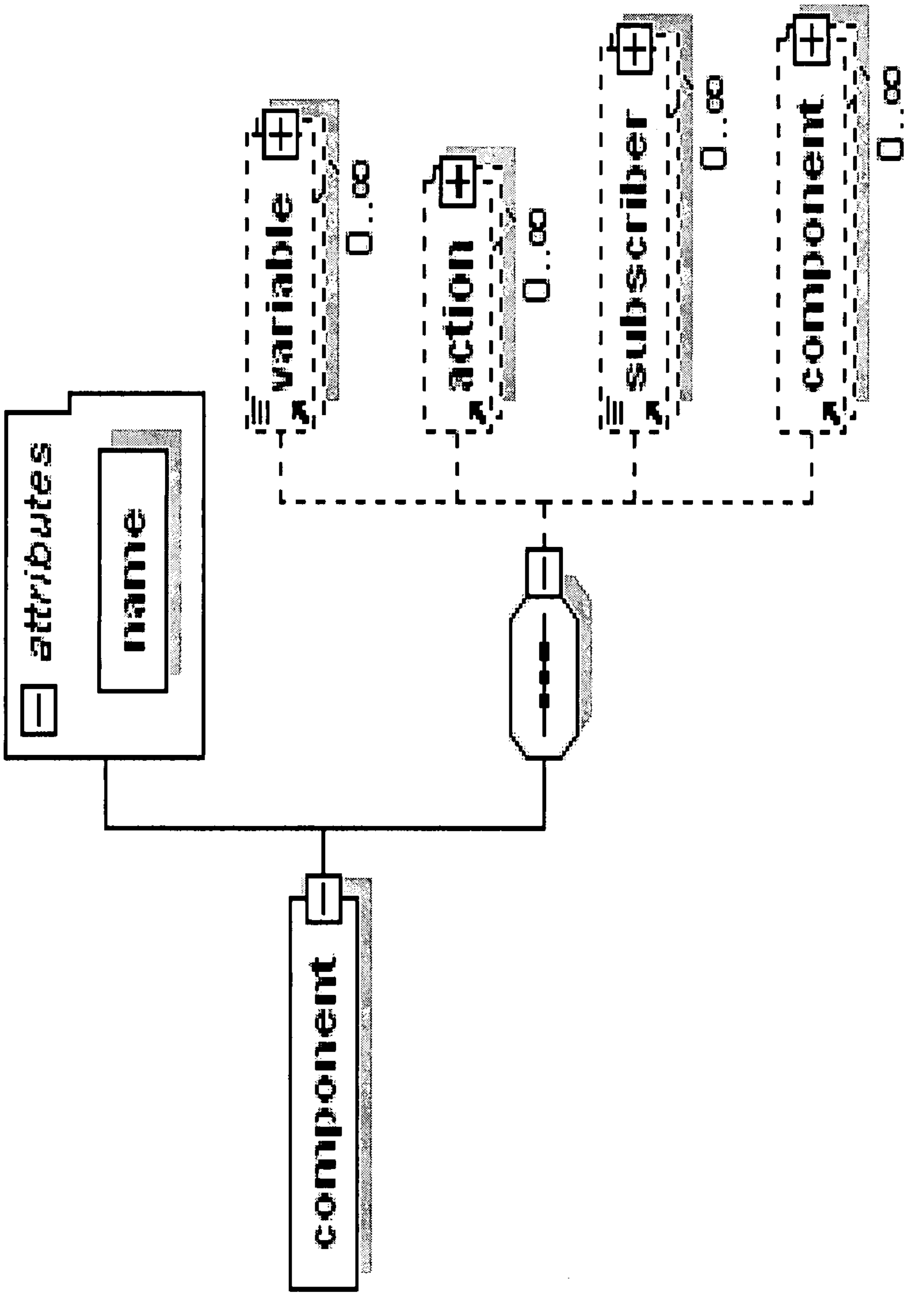
FIG. 2B illustrates an example of an application component object model that is part of the application definition language portion of the abstract web presence model.

FIG. 2B illustrates an example of an application component object model that is part of the application definition language portion of the abstract web presence model. The application component (also referred as simply an application) definition which has a namespace, one or more required attributes and one or more optional elements. In an exemplary implementation of the ADL, the components will be in the same namespace as the parent cell of the component, i.e., urn:com:ludi:webos:cell for a component of the exemplary cell above and the only required attribute is an ID which is the name of the component. The optional elements of each component may include:

Zero or more sub-components
Zero or more event handlers
Zero or more abstract variables
Zero or more Variables
Zero or more actions/methods
Zero or more subscribers
a label Abstract variable has a required attribute which is a name. The Variables may include simple variables that extend the Abstract Variable and may include required attributes, variable content and optional elements. The required attributes of each Variable may include a context of the variable which is an enumerated data type with values of Cell (default), Session or Actor wherein the context defines the scope of the variable that can be within a cell (the default) within a session of a user or for all sessions of the actor. In addition, the required attributes of each Variable may include a type definition (xsd: int). The Variable content may include a Formula (xsd: anyType) wherein the formula can refer to other variables and there may be either constant formulas, variable reference formulas, query-oriented formulas, or compound formulas made up of an operator and some number of sub-formulas. The optional elements for a Variable may include an Order [Reference, e.g., XPath] that has the required attribute of a name. An exemplary schema definition of the application component is included in the Appendix B.

Figure 2C:
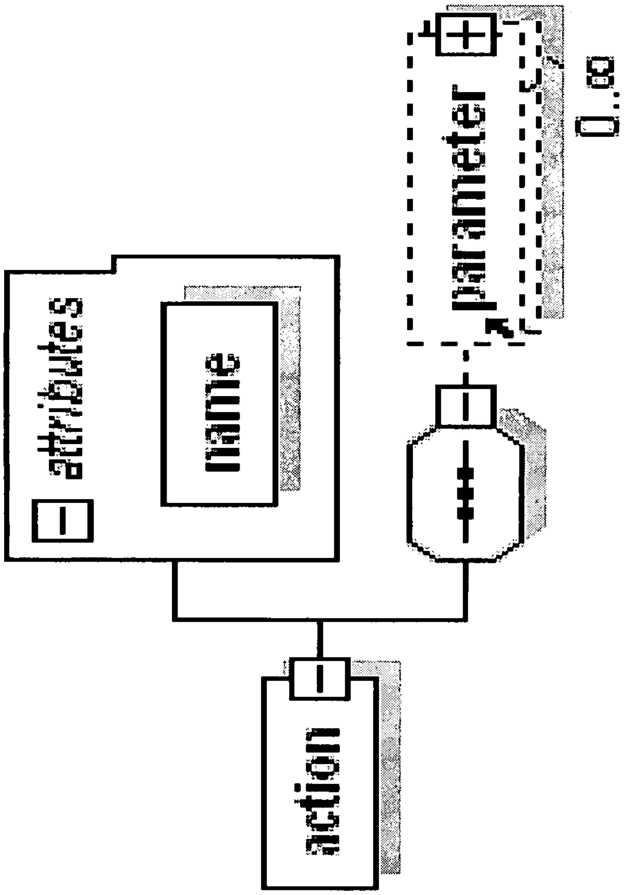
FIG. 2C illustrates an example of an action object model that is part of the application definition language portion of the abstract web presence model.

FIG. 2C illustrates an example of an action object model that is part of the application definition language portion of the abstract web presence model. Actions defined in context of an application or its sub-components can be implemented as local or remote object invocations. Hence, actions can specify references to local objects that are implemented in Java or other common scripting languages used in browser clients such as Javascript. Remote object invocations can be expressed in terms of standard interface definitions using WSDL/SOAP description of operations, request and response messages, binding mechanisms, transport protocols and data transfer formats. Furthermore, the remote service invoked as a result of the action being carried out may require transfer or retrieval of content of any type which could be described using the Universal Item Description language (UIDL). As shown in FIG. 2C, each action may include a name, zero or more {name-type-(default) value} triplets and a return type (of action).

FIGS. 2D1 and 2D2 illustrate an example of a variable object model that is part of the application definition language portion of the abstract web presence model. Variables can be defined in particular context using the scope attribute. The scope of the variable could, for example be in context of a cell or a user account or a session wherein the user interacting with an application may have multiple sessions. Variables include a formula that is used to specify the value of the variable. For example, the formula of a variable could refer to the value of another variable in the current application or some other sub-component with the cell, a variable in the session, or a variable at the account level. A formula of a variable also can be specified using a constant. A formula of a variable also can be specified using an application-level query (expressed in the situated query language which is described in more detail below). A formula of a variable can be expressed using a compound formula composed of an operation and some number of sub-components. Traditional application programs define variables using assignment statement such as x=22 or x=y+1. Using the Application Definition Language (ADL) the approach used is different since the formulas define the relationships between variable values such that those values can be dynamically re-calculated. Furthermore, the formula can employ the situated query language to access items of any kind from the local cell server or some other cell server depending on the context of the variable that is applicable as the scope of the query. Hence, the re-calculation of the variables can potentially take place exploiting any content or informational model for example the object-oriented Universal Item Information Model (UIIM). Further, as events happen and variable values change, the values of variables dependent on these changed values (via formula) can be recalculated. The computational process of managing these run-time variables and dynamically re-calculating their values in context of specific cells is not possible in existing business process description languages such as Business Process Execution Language (BPEL) and existing spreadsheet software products. For example, BPEL supports variables via Java extensions to BPEL to support Java process variables but such variable data processing does not have the capability to update value of the variable using the result of a single query against the current cell of the variable or two or more queries against multiple cells (which hosts application and content server) within the scope of the variable. Hence, the idea of variables that can be recalculated and computed using formulas of the above mentioned types and in a particular context is advancement from present standards and products.

Hence, an application defined using the Application Definition Language (ADL) may incorporate a variable handling process. Since variables defined as part of the component definition can be scoped at the account-level, session-level, and local component level, the variables can therefore be accessed from and saved to the appropriate domain (i.e., account, session, or local component). Furthermore, a second approach of the accessing variables automatically at run-time, i.e., without needing to explicitly specify it is to access the variable value using the following order (i.e., heuristics of implicitly scoping the variable): (a) cell instance, (b) session instance, (c) account instance.

In a variable handling example, suppose that a user wants to retrieve, for a specified user, all his friends within 100 miles from zipcode of the account holder (i.e., the specified user). Following steps would need to be carried out to do this: 1) access the zipcode variable (from the address of field) defined at the account-level; 2) define an action that executes a query to return list of friends (and their accountIDs) via their corresponding contact item kinds being tagged with "friends"; 3) for these list of friends, have an action to compute the distance from the zip code of the friend to the zip code of the account holder; and 4) the action would return the list of friends that have a zip code with a distance less than 100 miles.

FIGS. 2E1 and 2E2 illustrate an example of a situated query object model that is part of the application definition language portion of the abstract web presence model. The query can be expressed as part of the formula for a particular variable. The query format will be of the following: [Type] [Scope] [PageSize] [MaxSize] [Expression] wherein each query has following required top-level components [Type], [Scope] and an [Expression] component and following optional top-level components: [PageSize] and [MaxSize]. The [Expression] component comprises the sub-components <conditions>, <kind>, <orderby>, <filter>, <connect>, <tag>, <groupby> and <count>.

Each query consists of:

Scope [extension based XML/XML Query]

Condition [leveraging XML Query]

Order [leverage XML Query Language, e.g., Document Order feature]

PageSize [leveraging XML Query]

The data model of the queries will leverage a subset of XML Query Language such that the data model can represent various values including not only the input and the output of a query, but potentially all values of expressions used during the intermediate calculations. Examples of the query may be:

input Item XML document instance represented as a Document Node or a sequence of Document Nodes, result of a path expression (represented as a sequence of nodes)

result of an arithmetic or a logical expression (represented as an atomic value), a sequence expression resulting in a sequence of Item XML document instances The query structure and examples is described in further detail below with reference to FIGS. 24-26.

Figure 2F:
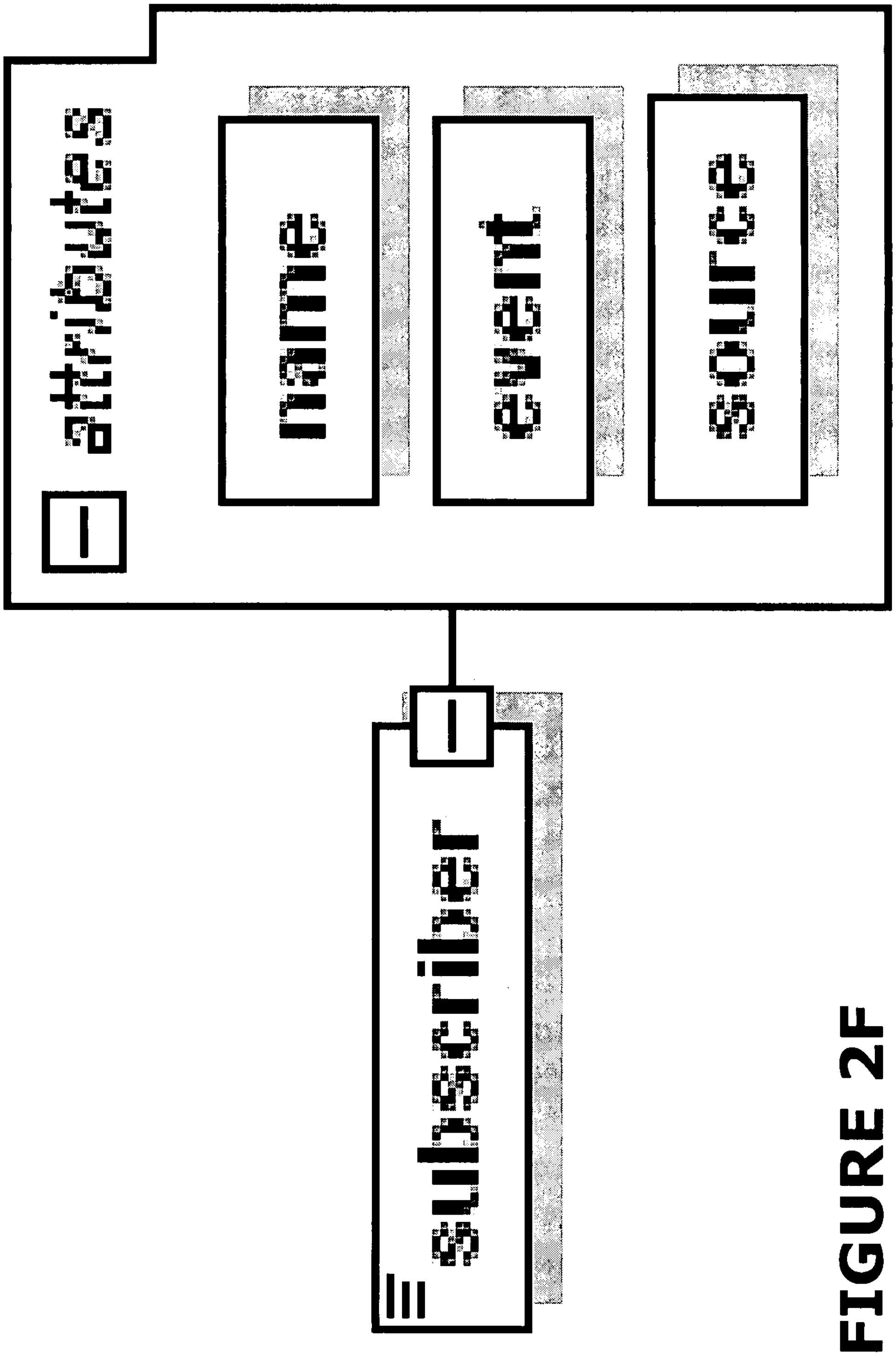
FIG. 2F illustrates an example of an event subscription object model that is part of the application definition language portion of the abstract web presence model.

FIG. 2F illustrates an example of an event subscription object model that is part of the application definition language portion of the abstract web presence model. Events subscribed by an application component can be defined in terms of the name of the subscriber that typically represents the unique identifier of the component that consumes the event, name of the event that represents a unique identifier of the event type, the source of the event that represents the unique identifier of the producer of the event. Typically, the events would be subscribed, produced, and consumed between components within an application, i.e., sub-components within an application or between the application and a sub-component. However, there could also be events that are produced by a cell's server which are propagated, for example, using a message queue (where the event is enqueued) to the subscribing applications so that relevant updates and/or processing may take place. For example, if two users are sharing application via their own instances of it that have a note component embedded in it and one of the user has updated the note component, it is possible for the cell to produce an event letting all subscriber applications know that a new note has been produced and can be displayed to the users of these applications that have been instantiated in their specific sessions.

Figure 3A:
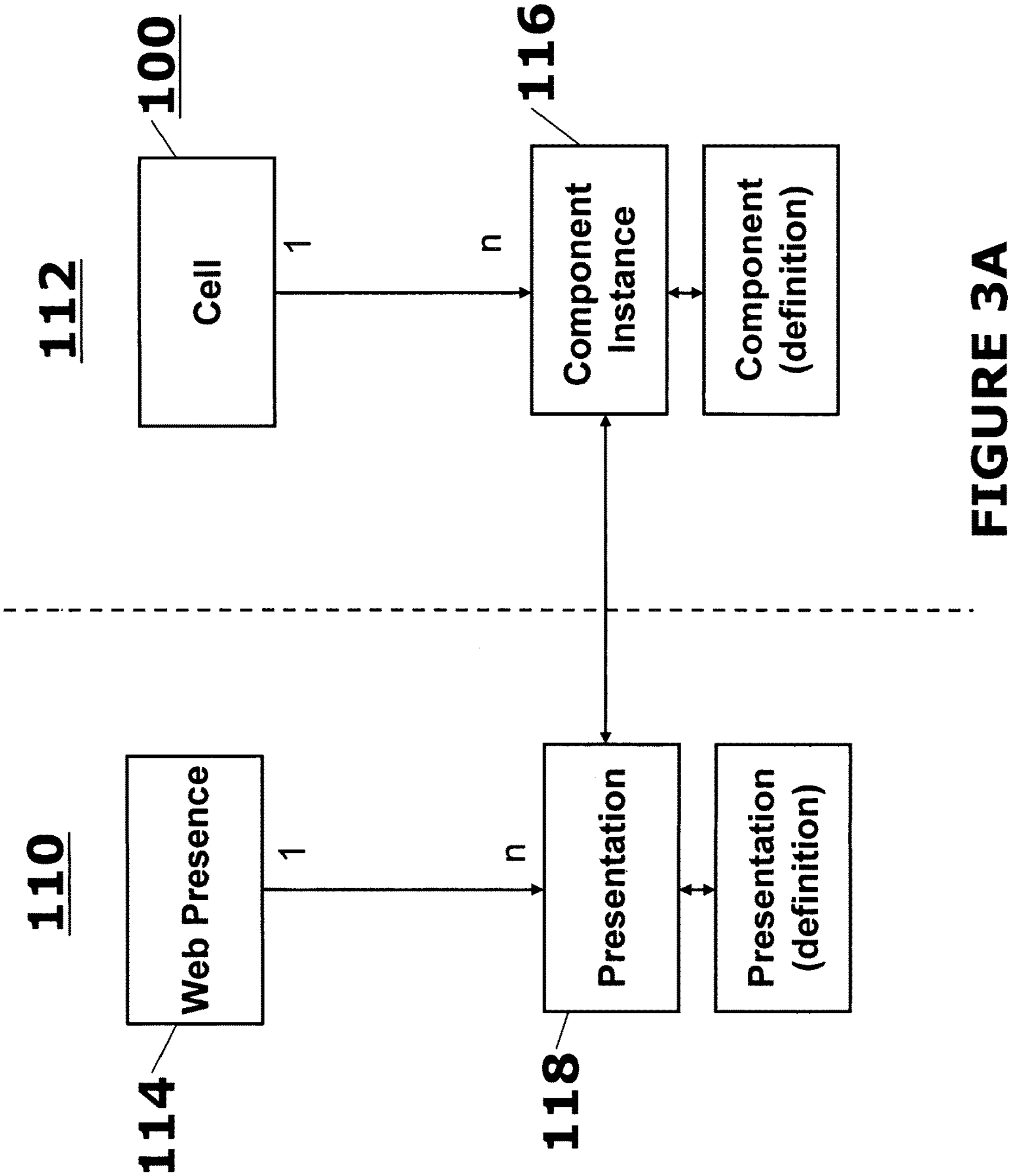
FIG. 3A illustrates an example of a cell instance data structure of a packaged web application of the scaleable information system shown in FIG. 1.

FIG. 3A illustrates an example of a cell instance data structure of a packaged web application of the scaleable information system shown in FIG. 1A. The web presence model may include a presentation layer 110 and an application layer 112. Thus, each element of the application layer has a corresponding presentation layer element. For example, each cell 100 corresponds to a web presence 114 wherein each web presence is an instance of the cell that has the presentation portion and the computation portion as described above. A particular web presence 114 may include one or more presentations that are defined by the presentation definition (the WDL). A particular cell 100 may include one or more component instances 116 that are defined by the component definitions. Each component instance (a particular action/operation of the web presence) has a corresponding presentation portion 118. Each cell instance is a packaged web application in that it contains the application as well as the data/content associated with the application that may be stored in a database contained within the cell instance.

Each component 116 contains definitions of variables, properties etc. that determine computational model of the presentation while each corresponding presentation defines a mapping from the component model to visual components, e.g., what data is involved to compute presentation state. The view (or layout or format) of each presentation defines how data is presented to end-users and relays user actions back to controller (which includes actions that are local procedures/methods and also optionally event handlers). Each presentation can possibly have multiple layouts, for example, optimized for particular devices. The style is specified to change appearance of a presentation without changing its behavior or capabilities, like a color, font size etc and the presentation layout can have multiple associated styles that are selectable by end-users. A composite presentation consists of a parent widget and additional sub-presentations that will communicate via invoking method-oriented actions.

Each cell definition/model may include a namespace, one or more required attributes and one or more optional elements. In an exemplary implementation of the ADL, the namespace may be: urn:com:ludi:webos:cell and the only required attribute is the CellID that uniquely identifies each cell. The optional elements of each cell may include:

Zero or more components (wherein there may be one or more components nested within each component)

A label

Figure 3B:
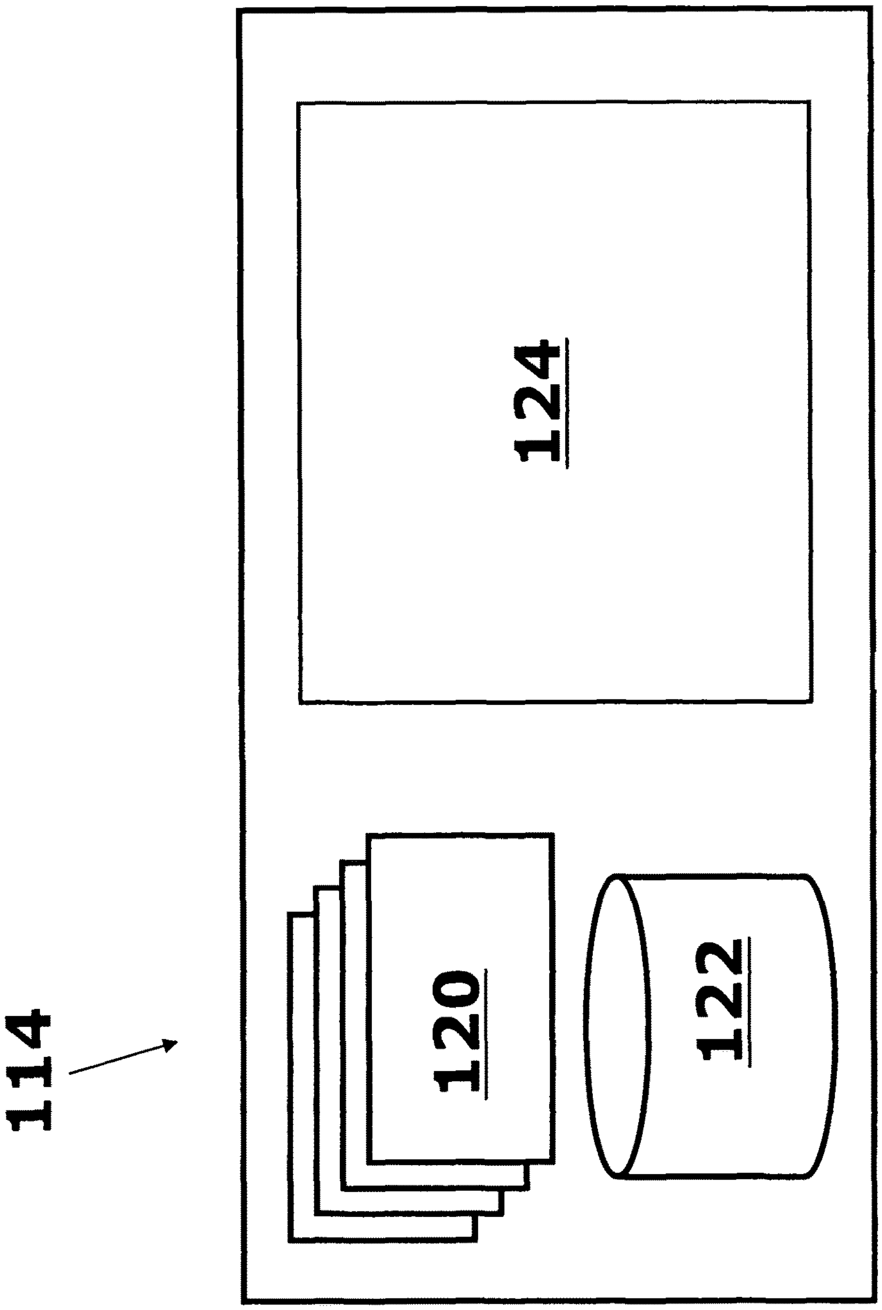
FIG. 3B illustrates an example of a contact management web presence for a particular user.

FIG. 3B an example of a structure of a web presence 114. Each web presence is an instance of an application and a database local to the web presence, with a member list and role based permissions. The application is a set of interrelated components with variables. Each view on a web presence has its own instance of the application, with its own set of variable values. As shown in FIG. 3A, the web presence may include the one or more application instances 120 that define declarative aspects of the web presence, procedural rules for the web presence and the presentation for the particular web presence and a database 122 associated with the web presence that may include an index. The web presence may implement one or more processes/operations/functions 124. The operations may include role based permissions for the web presence that define which users can view/modify/delete the information associated with the web presence. The web presence may also include object oriented recalculation in which, when information or data is modified in the web presence, any other information or data in the web presence that has an association with the modified information or data is automatically recalculated and updated (which may be known as a refresh.) The web presence also includes business process and workflow processes as well as inter-application communication (events and messaging) between the one or more applications that are part of the web presence and other web presences. The web presence may also include automatic data transformation in which the web presence transforms data as needed, type based actionability and an activity log, audit trail and metrics.

FIG. 4 illustrates an example of a set of code 130 used to implement a web presence template catalog. In an exemplary implementation, the code is XML code as shown in FIG. 4. The web presence template may be used to generate a visual catalog from which a user of the system may select a pre-defined web presence. The web presence catalog may include an auto web presence 131 and a book web presence 132 wherein examples of the user interface of the autos web presence and book web presence are shown in FIGS. 5A and 5B and examples of the code used to implement the autos web presence and book web presence are shown in FIGS. 6-7.

Figure 5A:
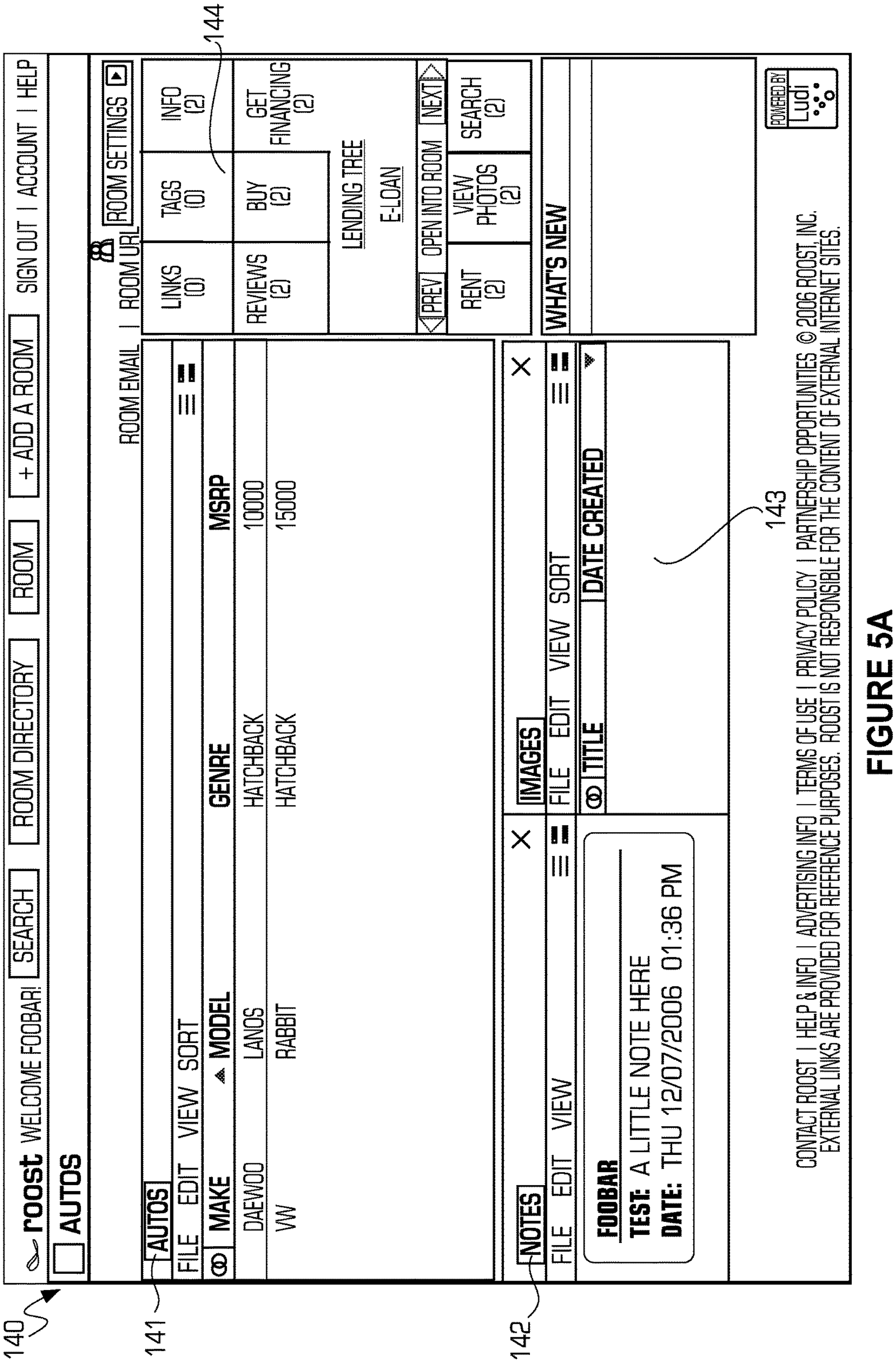
FIGS. 5A and 5B illustrate an example of autos web presence and a book web presence, respectively, generated based on the catalog shown in FIG. 4.
Figure 5B:
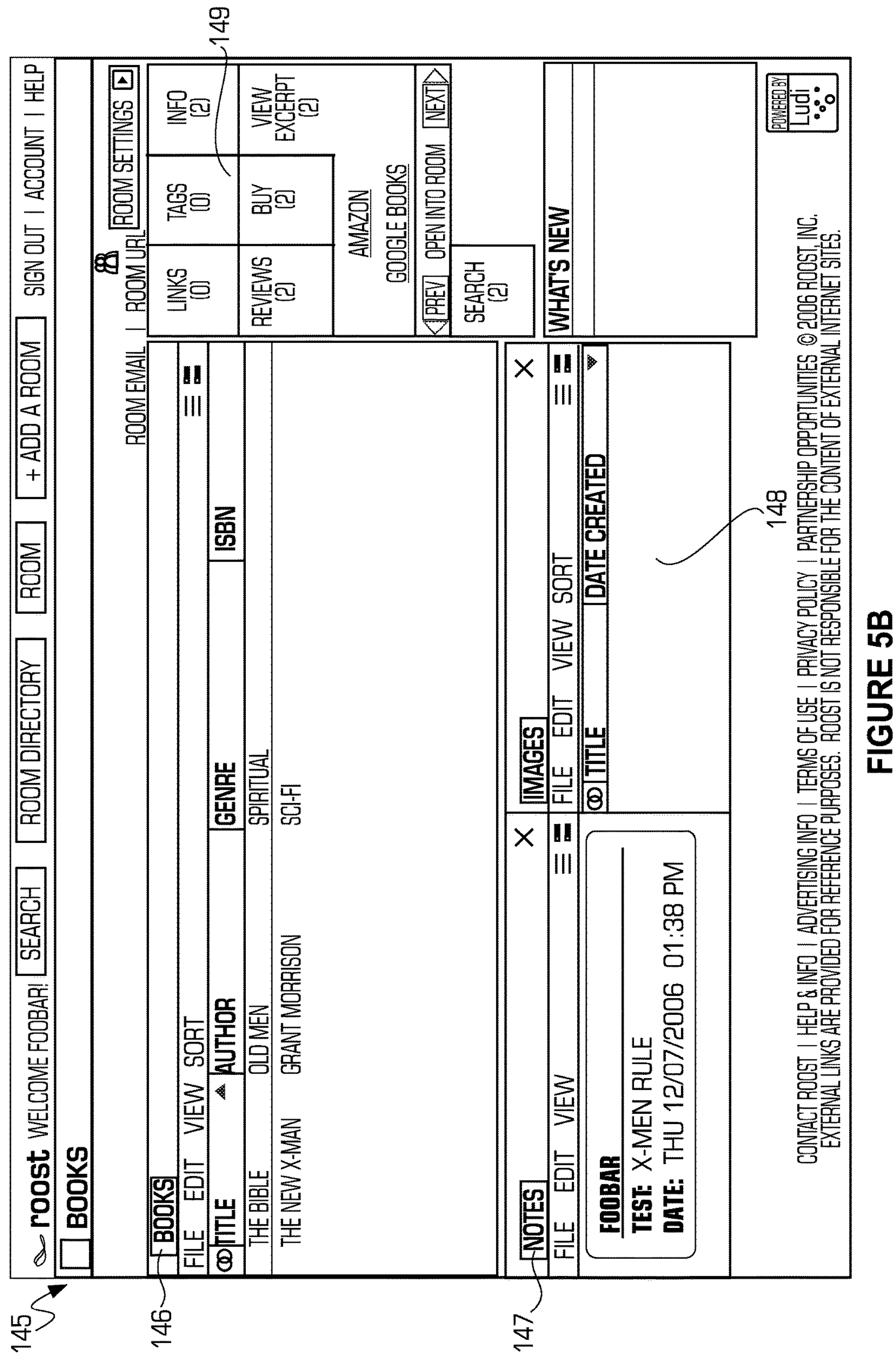

FIGS. 5A and 5B illustrate an example of autos web presence and a book web presence, respectively, generated based on the catalog shown in FIG. 4. An autos web presence user interface 140 is shown in FIG. 5A wherein the web presence has an autos portion 141, a notes portion 142, an images portion 143 and an application portion 144. Additional applications can be added to a web presence (i.e., making the application web accessible) from an application catalog. A books web presence user interface 145 is shown in FIG. 5B wherein the web presence has a books portion 146, a notes portion 147, an images portion 148 and an application portion 149.

FIGS. 6A-C are examples of code for an account cell, an auto cell and a book cell for the auto and book web presences shown in FIGS. 5A and 5B. In particular, FIG. 6A illustrates an account cell that defines each account for the web presences shown in FIGS. 5A and 5B and may also contain the account level common variables.

FIG. 6B illustrates a set of code 150 for the auto cell wherein the variables common to the auto cell are defined and the components for the auto cell are specified. As described above, the auto web presence is implemented using the auto cell and the user interface of the autos web presence is defined in the web presence. The auto cell defines the computational aspects of the particular web presence. In this example, the auto cell includes a set of components 152 for each portion of the user interface (including an autos component). Furthermore, when we add an auto application to a web site it will result in a change in the definition of the cell such that cell includes the application component that will execute in context of the web site and within the web server for that cell.

FIG. 6C illustrates a set of code 160 for the book cell wherein the variables common to the book cell are defined and the components for the book cell are specified. As described above, the book web presence is implemented using the book cell and the user interface of the book web presence is defined in the web presence. The book cell defines the computational aspects of the particular web presence. In this example, the book cell includes a set of components 162 for each portion of the user interface (including a book component).

FIG. 7A is an example of a set of code for the auto component for the auto web presence shown in FIG. 5A. In this example, the setSortOrder action allows the sort to be changed. Also, the action specification of the Auto component defines the parameters sortPath and sortDirection which can change as a result of the completion of the action. The auto component also defines a sort path and a sort direction variable for the auto component. The auto component also defines an Autos ItemList and a ConnectedAutos ItemList. The auto component also defines a setSortOrder action based on the sort path and a sort direction variables defined above. Thus, the auto component contains the basic functions of the auto web presence including the two types of lists. In the exemplary code shown in FIG. 7A (and in the other code in this patent application), the code may also include variable reference formulas (see for example <orderby direction="${sortDirection}">${sortPath}</orderby>${cell.tagFilter} in the code) wherein the "${sortPath}" is a variable in the formula that is filled in at runtime and then the formula is computed.

FIG. 7B is an example of a set of code for the book component for the book web presence shown in FIG. 5B. In this example, the book component defines a sort path and a sort direction variable for the book component. The book component also defines a Books ItemList and a ConnectedBooks ItemList. The book component also defines a setSortOrder action based on the sort path and a sort direction variables defined above. Thus, the book component contains the basic functions of the book web presence including the two types of lists. Now, a data management system and method that can be used for an exemplary embodiment of the application specification is described in more detail.

Figure 8:
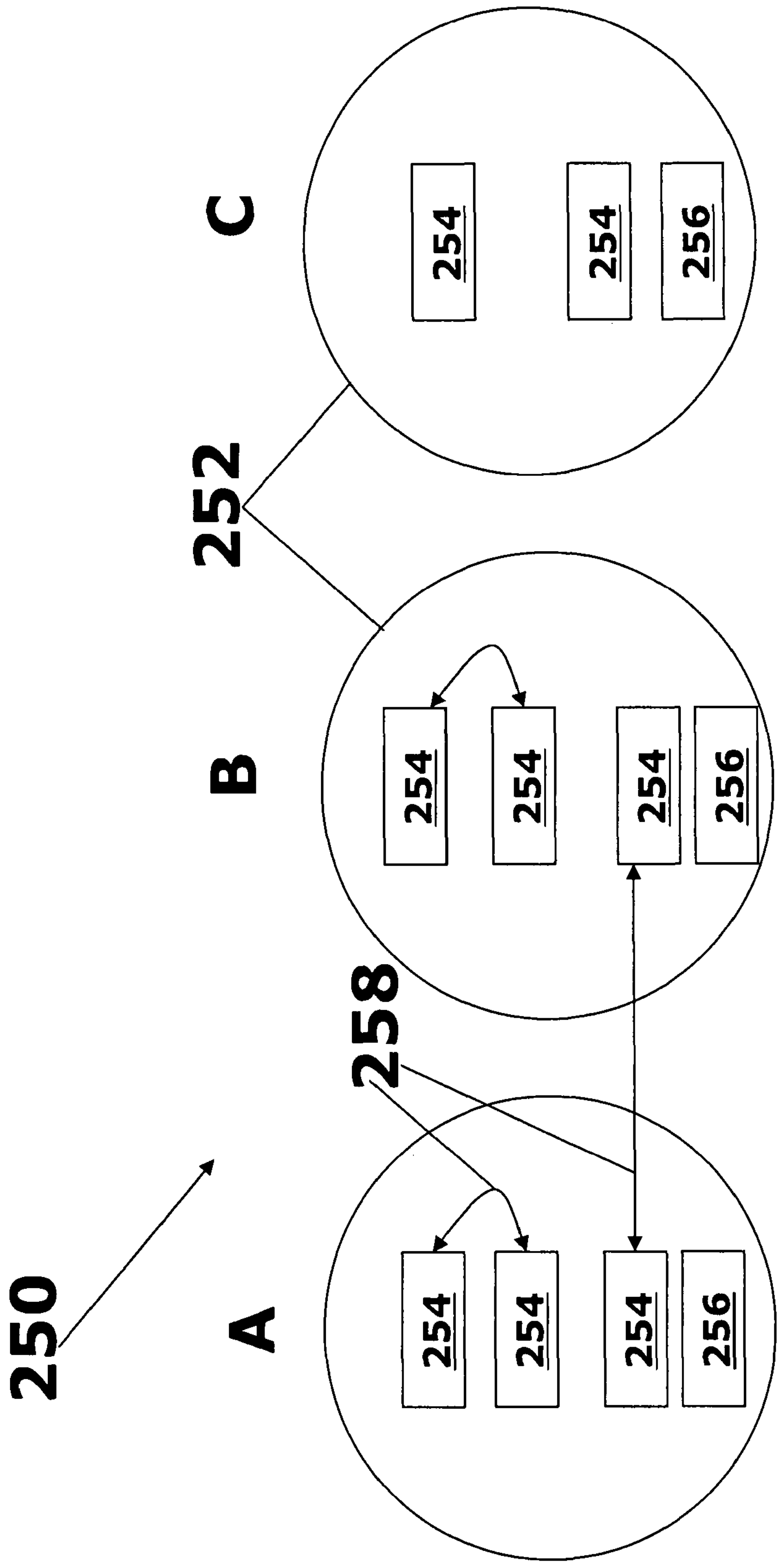
FIG. 8 illustrates a data management system.

FIG. 8 illustrates a data management system 250 wherein one or more cells 252 (such as Cell A, Cell B and Cell C as shown in FIG. 8) manage the storage, access, update and integration of typed objects and other information associated with the typed objects. Each cell may also include one or more instances 254 of various types of objects that are contained within the cell. Moreover, cells may also contain any number of applications. Hence, the server that hosts a cell instance manages both the hosting of applications and local storage of content. An exemplary embodiment of each cell may be a XML document-oriented container in a commercially available XMLDB database as described in more detail below. In general, each cell may have a set of indices 256. In an exemplary embodiment, each object in a cell may be an item that is an instance of a type that extends from the AbstractItemKind base type as described below in more detail. In the data management system, an object may be connected to another object in the same cell or in a different cell via a connection 258 as shown in FIG. 8. Each connection may be implemented as a field/container/record within an object record of the data management system. The connections permit a user of the data management system to associate one or more objects with each other wherein the connections may be generated by a user or automatically generated by the system. An example of a ContactItemKind object with one or more user generated connections as well as one or more automatically system generated connections is described in more detail below. Each object in the cell may also have zero or more tags associated with the object wherein each tag associate a piece of information with the particular object wherein the tags may be generated by a user or automatically generated by the system. An example of a ContactItemKind object with one or more user generated tags as well as one or more automatically system generated tags is described in more detail below. Hence, each cell contains a data base (the objects in the cell) so that the data for the cell is contained within the cell. The data management system may also implement a situated query language (described below in more detail) wherein the query is composed and processed from the perspective of a Cell X (i.e., query is processed based on the object(s) within Cell X) and other cells in certain relationships to Cell X. Such queries may be known as situated queries. In the exemplary embodiment, the query language may leverage XQuery 1.0 (an XML-based Query Language standard developed by W3C). Situated queries will allow queries to be expressed according to the personal situation of the user such that user can retrieve and compare information from specifically identified and/or relationally described context; and that the meaning of these queries persist as the applications which contain them when moved from one cell to another cell.

Figure 9A:
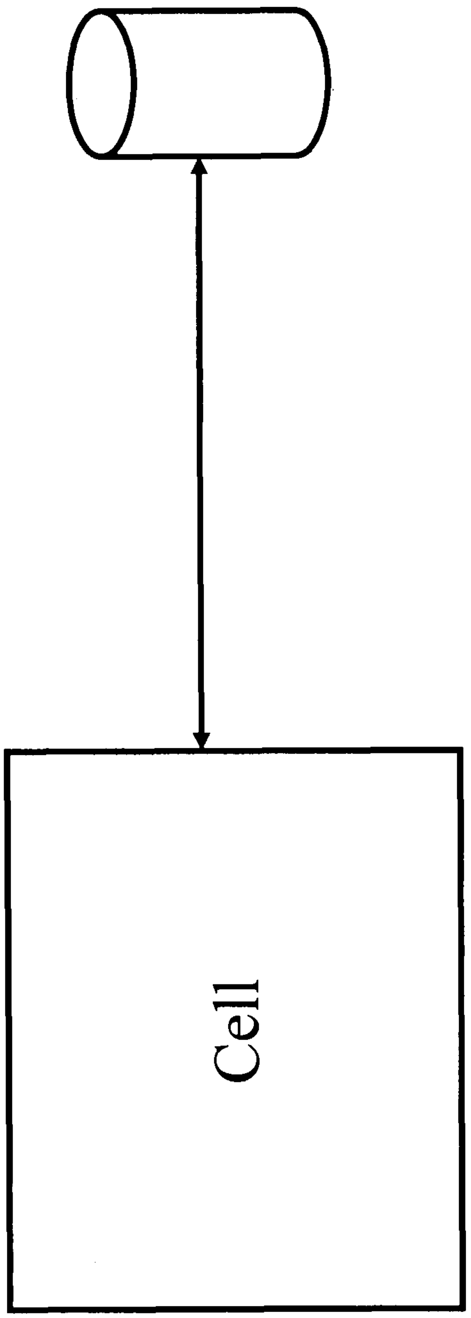
FIG. 9A illustrates a storage model of the data management system where a cell instance, functioning as a server that host both application and content server, has a dedicated database container that employs a storage device.

FIG. 9A illustrates a storage model of the data management system. In the storage model, item instances or object instances pertaining to a particular cell may be stored in a document container managed by a XML Database System. Hence, each cell may be stored in its own XML DB document container that functions as a document-centric container for all of the item instances belonging with that cell. Furthermore, since the document-centric container of the XML DB holds a collection of item instances as XML documents, each cell instance can have a collection of heterogeneous content that employs the Universal Item Information Model (UIIM) to enforce a consistent data type model that is object- and semantic-oriented and extensible and uniformly represented as item instances in the DB container whose types are described using the Universal Item Description Language (UIDL). This approach to data management is fundamentally different than existing web and enterprise applications that maintain a dedicated database table, possibly on a dedicated database host, for each type of content. For an application that needs to integrate and have access to a wide variety of content, for example media (including photos, videos, audio and podcasts), blogs, calendar, contacts, email, and other structured data (including automobile, books, movies, etc.) which are supported by specific third-parties that specialize in specific types of e-commerce services and catalogs of items, and other unstructured content that may be generated by end users, it will be an expensive scalability and extensibility approach to maintain dedicated database tables for each type of content. The above described approach of maintaining dedicated database instance for a cell which hosts both application and its content such that it allows storage, access and integration of various types of content to be more scaleable and extensible than existing database-driven web and enterprise applications.

In an exemplary implementation of the data management system, a commercially available Berkeley XML embeddable database is used as the storage device for the cells and the one or more items in each cell. In the exemplary implementation, the objects stored within cells use the object- and semantic-oriented Universal Item Description Language (UIDL) (extending the well known XML Schema definition language) to describe those objects. The cell interfaces with an embeddable XML database (whose document-centric container is used to store and access any type of content) which provides native XML support and no processing overhead cost due to XML-to-Java-to-SQL transformation (typically expected in existing Java-based database driven applications). Elimination of such data transformation and SQL round-trips over the network will result in decrease in cost of procuring server hardware and a scalable and extensible data management solution. Since there will be no SQL call-outs due to the content being locally accessed, inserted and updated there will also be better performance and response time. Furthermore, the model partitions large data sets of heterogeneous items into smaller contextual subsets containing items likely to be processed at the same time together with applications which will do the processing. In addition, for the exemplary implementation, there is no need to develop another XML querying mechanism since the system can exploit XML Query support in the commercially available Berkeley Database XML using the W3C XQuery Language. Thus, the system may utilize an XML database for content storage in combination with the Universal Item Information Model (UIIM) and XML-based Universal Item Description Language (UIDL) described above in the exemplary embodiment.

Figure 9B:
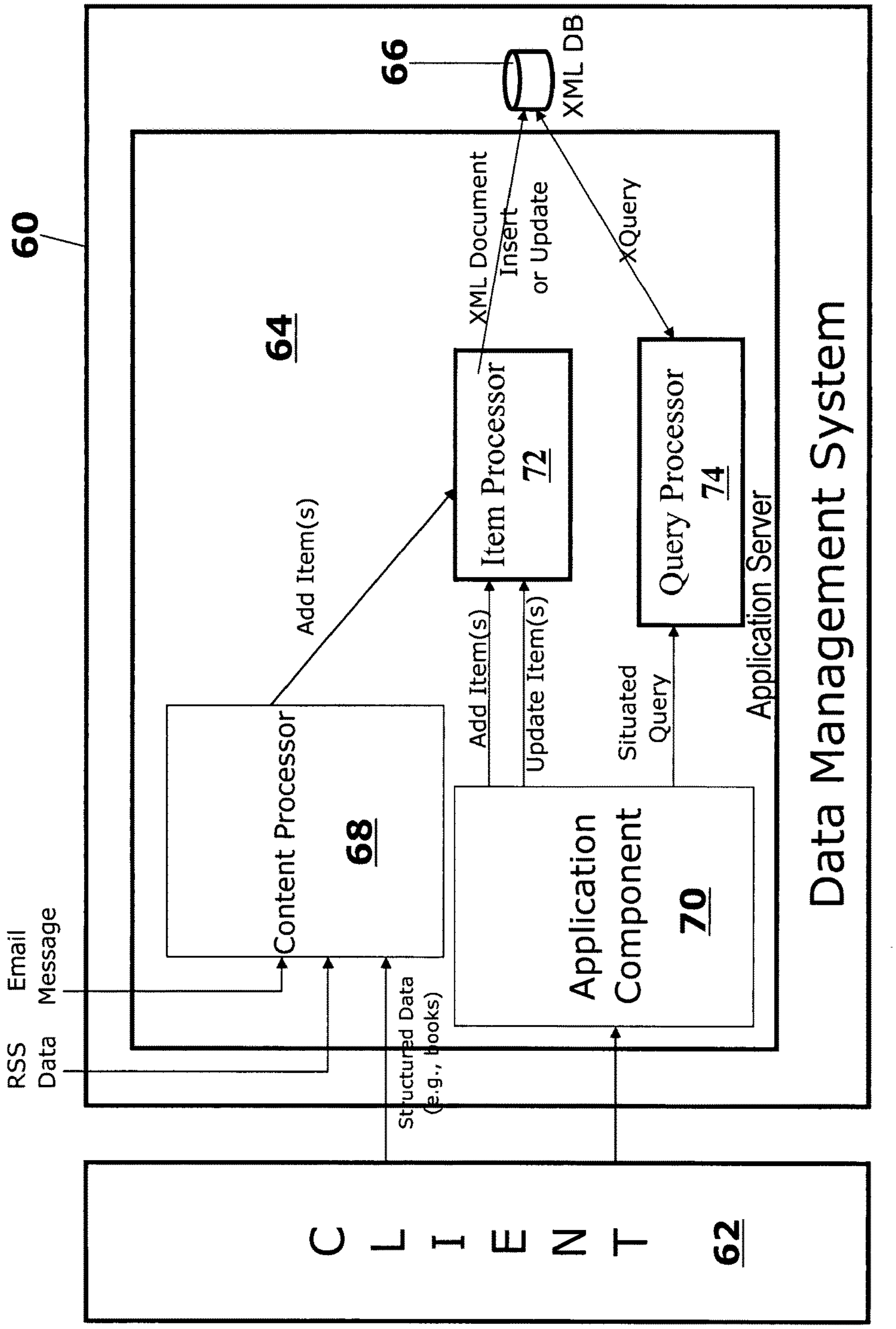
FIG. 9B illustrates more details of the data management system shown in FIG. 9A.

FIG. 9B illustrates more details of the data management system 60 that interacts with a client 62 in order to host applications and manage storage, finding and retrieval of typed items with support for tagging, connections, and situated queries. The data management system may further include an application server 64 and an XML database 66 as described above wherein the application server interacts with the XML database. The application server 64 may further include a content processor 68, an application component 70, an item processor 72 and a query processor 74. The content processor 68 may receive information and content such as RSS data, email messages and structured data such as books, and process that data to add item(s) into a cell that is stored in the XML database using the item processor 72. The application component 70 may be a piece of code that performs various operations and functions on the items in a cell wherein certain elements (an XML document insert or update or query) interact with the XML database 66. For example, the application component may add item(s) or update item(s) in a cell (using the item processor 72) in order to perform an XML document insert or update operation with the XML database 66. The application component may also generate a situated query (described below in more detail) for item(s) in the one or more cells which is processed by the query processor 74 in order to generate a XQuery expression that is applied to the XML database 66. The content processor, item processor and the query processor may be implemented, in an exemplary embodiment, a plurality of pieces of computer code that are executed by the application server.

FIG. 10 illustrates an example of Java code that can be invoked at run-time to create a document instance in the XML embedded database that may be used in the exemplary implementation of the data management system. The document instance represents any user-defined content that is defined as an instance of a specific XML object type (that is derived from the base object type (the AbstractItem type in the exemplary embodiment). The data storage model can be used to store any type of XML content such that all content stored in the DB container are XML document instances of various types. Hence, the data management system can store heterogeneous types of objects for a given cell. Each cell has a dedicated DB container which is used to manage storage and access of required content/objects contained in the cell. The transaction parameter in the code is the transaction that is participating and/or processing a document instance represented by the document parameter in the code such that the document instance (representing an item) is created in the specified XML database container whose name is specified along with the document name and related data and metadata. It should be appreciated that this is basically the generic use of the XML Database System for cells that function as server instances which host applications and manage content. Now, an example of a Universal Item Information Model (UIIM) that may be used to model types of content stored and accessed using data management system will be described in more detail.

A Universal Item Information Model (UIIM) is presented that accomplishes several goals and overcomes certain problems that have existed. In particular, the universal item information model can be used to personalize and simplify the process of content consumption, sharing and publishing in a system in which various types of existing and new user-defined content needs to published, consumed and shared by and from various sources. The universal item information model addresses data integration from disparate sources as is needed currently in the areas of social networking, consumer-oriented and business-oriented application integration platforms. The Universal Item Information Model (UIIM) also provides the ability to preserve and leverage existing and legacy content formats within the Universal Item Information Model (UIIM) such that interoperability with existing consumers and publishers and their applications is possible within a networked community environment where a system supports the handling of all kinds of new and existing content.

Figure 11:
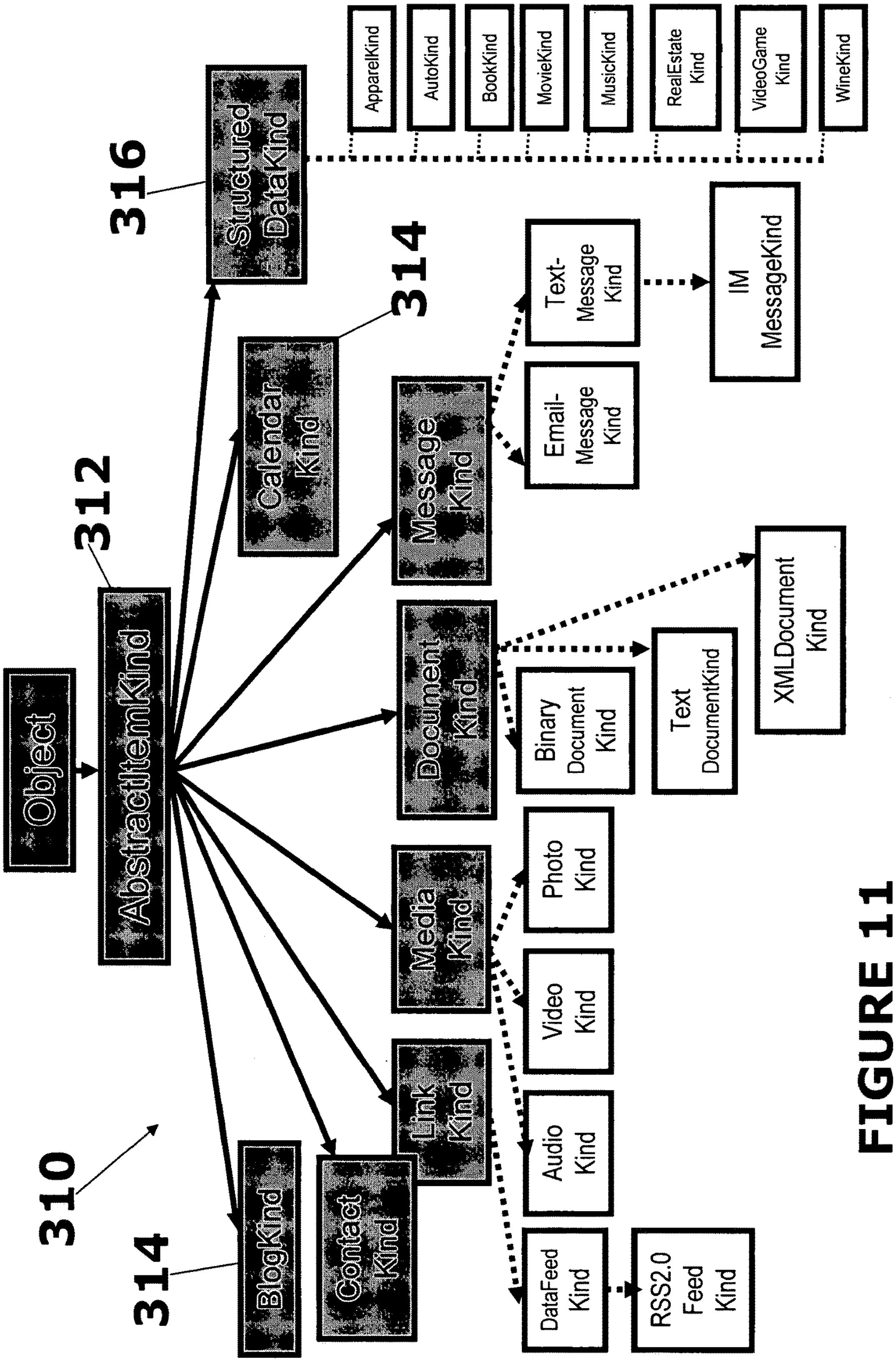
FIG. 11 illustrates a Universal Item Information Model.

FIG. 11 illustrates a Universal Item Information Model 310 for an item that is an exemplary embodiment of the Universal Item Information Model. The Universal Item Information Model for an item may be used to support a pluggable content model such that the model can describe any item using a generic item description (an AbstractItemKind 312) that is applicable to any type of information item. The underlying item's format is preserved via encapsulating (or wrapping) the original item in a type-specific container item defined within the universal information model. The type-specific container items are created using specialized component types that employ the Universal Item Information Model that has an AbstractItem kind component which describes any item using a generic abstract definition. Extending the AbstractItem component via type-specific container item kinds allows the creation of a universal item information taxonomy that comprises various types of information, for example, BlogKind, CalendarKind, ContactKind, DocumentKind, LinkKind, MediaKind, etc. The direct extensions from the AbstractItemKind are referred to as the base component types (and their instances are referred to as base components) since they describe generally an item component within a general domain, for example, a MediaKind component refers to generally all kinds of media item. The base component types can be extended to additional specialized types to express specific characteristics, for example a PhotoKind extends the MediaKind. The universal item information taxonomy will also be referred as the universal item taxonomy. Hence, the type-specific container item kinds (representing specialized types of content and information) extend the AbstractItem component which is the base type of the model. The Universal Item Information Model allows a system to represent and manage the access, distribution, management and actionability of any type of item by describing its schema using the Universal Item Description Language (UIDL). The initial set of universal information item component types within the UIDL schema framework are expressed using the W3C XML Schema Definition (XSD) Language, but it is possible to describe the base and derived components of UIDL in various other object-oriented languages. New types of content created by a user or a user-defined application can be expressed by defining a new component type that extends from the AbstractItem base type and/or from one of the existing base component types already defined within the Universal Item Taxonomy, for example, the DocumentKind or MediaKind if it is a new type of document-oriented or media-oriented content. The new user-defined content (also referred as a new type of item) can be published or shared within a community of users as an instant of the newly defined component type. Hence, the Universal Information Model supports an extensibility mechanism that is needed to model, describe and instantiate new content generated or consumed by a user or a community or an application. This extensibility mechanism is within the framework of abstracting an information item as an AbstractItem from which any specific kind of information item can be derived as a specialized type.

Since the Universal Item Information Model (UIIM) and Universal Item Description Language (UIDL) can be employed to model and represent various types of information items, it should be noted that items expressed in UIDL can be stored in a database or in-memory cache, or transmitted on-the-wire over any communication channel (for example, HTTP, TLS, SMTP, SMS), or instantiated by an application service—all of these scenarios can employ the same description of the item based on UIDL.

FIG. 12 illustrates an exemplary implementation of a data structure for an AbstractItem and FIG. 13 illustrates an example of a schema describing an AbstractItemKind. The AbstractItemKind is an abstract base type for all item content definitions (since all of the other item definitions are based on the AbstractItem and inherit the characteristics of the AbstractItem due to the inheritance of the object model) and is therefore reusable. Hence, the AbstractItem provides the base characteristics of each item in a system.

The AbstractItemKind includes sub-components that describe the general characteristics of any item in one or more general characteristics elements, such as the data structure fields shown in FIG. 13. These general characteristics are independent of the type of item and are included as part of the <ItemDetails> sub-element that Item instances inherit from the base type AbstractItemKind. A set of examples of the general characteristics of an item are:

LogicalServerID—this refers to some logical application and content server where the item is located and managed; this is also known as the cell server ID;

ContentSize—the size of the underlying content in bytes;

CreatedBy—the user who published (or inserted) an item; this user may or may not be the original publisher of the content rather the user who actually inserted (or copied) the content to a particular application and content server;

CreationTime—the date and time when the item was published (or inserted) via an application; this time may or may not be original publication date or time of the content rather the time when the user actually inserted the content in a particular application and content server;

ItemID—specifies the unique item identifier of the information item;

KindID—specifies the unique identifier to identify the type of content that the item instance is of;

LastModified—specified the date and time when the item was last modified;

Title—specifies a title of the item, e.g., this may be the Subject of the email or title of a book instance;

UpdatedBy—specifies the user who last modified the item;

The AbstractItem kind also includes sub-components that describe various semantic characteristics of any item (using one or more semantic property elements) as part of the <ItemDetails> child element that Item instances inherit from the AbstractItem component. These semantic characteristics provide capabilities to describe additional information about a specific content, i.e., item instance, in a personalized and context specific way such that it can be used for various search, information navigation and filtering and other actions applicable to a content of a certain type. The semantic properties can be expressed uniformly for all kinds of information items by defining various semantic components within the AbstractItem component. This approach implies that derived types of content (e.g., a item instances of the types PhotoKind or a BlogKind or an AutoKind) that are extensions of the AbstractItemKind component would inherit identical sets of semantic properties which are therefore applicable to all instances of those derived item types. Following is a set of semantic elements defined as part of the <ItemDetails> child element of the AbstractItem component:

Zero or more user-defined tags (represented by the <UserTags> child element) which are free-form text entered by the user to add additional meaning or context to a specific information item;

Multiple system-managed tags (represented by the <SysTag> child element) which are generated automatically by a system along some standardized set of attributes, for example, Time, Person, Location, Category, and Rating. It is expected that an application and content server, i.e., the system that processes the publishing or creation of an item would have capabilities to process the generic, semantic and type-specific descriptions of an item to generate the derived system-managed tags. The details of the system-managed tag model and structure is described in more detail below with reference to FIGS. 20A-20D;

Zero or more Notes (represented by the <Note> child element) which can be created by different users to describe an item in additional detail depending on the user's context and situation;

Zero or more user-defined connections which are used to connect related items to other item instances. The user-defined connections are described in more detail below with reference to FIGS. 22A and 225B;

Zero or more system-defined connections (described in terms of Source and SysConnID) which are generated automatically. For example, certain types of content are received via a communication channel such as email instances (via SMTP protocol) or RSS data feed (via HTTP protocol) and there is a need to connect the received content (e.g., the email) with additional content that is referenced and/or is part of it. E.g., a Photo attachment or a URL link included in an email would result in system-defined connections between the email message instance and the Photo item and Link item instances. The system-defined connections are described in more detail below with reference to FIG. 21.

Thus, the AbstractItem specifies one or more general characteristic elements (that can contain general characteristics) and one or more semantic property elements (that can contain the semantic properties of a particular instance of an item) of each item in the model. Since the above generic characteristics and semantic characteristics are described in a generic way for any type of item (that may be content), the universal item information model can be used by various types of applications wherein the applications can uniformly process the generic and semantic components of any type of item. In one example of the use of the universal item information model, the flexibility of the universal information model can be used by a scalable and extensible media operating system which can host media-rich applications that will be shared and customized by a consumer-oriented user community or a business-oriented user community.

Returning to FIG. 11, the model may have one or more core component types that are use case independent and are primitive data types. The core component types may include an amount type, a binary content type, an identifier type, a measure type, a numeric type, a quantity type and a text type. The listing of the core component types for the exemplary embodiment of the information model is attached as Appendix A that forms part of the specification and in incorporated herein by reference. The model may also include one or more base components 314 (children of the AbstractItem) that are reusable item kinds that permit, in this example, a particular type of item/content to be stored using each particular type of item kind. The base components may include a BlogKind, a ContactKind, a LinkKind, a MediaKind, a DocumentKind, a MessageKind, a CalendarKind, an EventKind, a To-DoKind, a TaskKind, a PhotoKind, etc wherein each of these base components inherit characteristics from the AbstractItemKind and then further define the characteristics associated with the particular type of item, such as a photo piece of content defined by the PhotoKind. Some of the base components may have one or more extensions to additional of specialized kinds of sub-items, such as the MediaKind having an AudioKind, a VideoKind and a PhotoKind or the MessageKind having Email-MessageKind and a Text-MessageKind (that has a IM MessageKind) wherein the sub-items inherit the characteristics of the ItemKind from which the sub-item is based and then contain further characteristics of the particular type of sub-item/content. For example, the BinaryDocument Kind inherits the characteristics of the DocumentKind and then has further characteristics that are associated with the binary document kind. The schema may also include one or more aggregated components 316 that consist of combining and encapsulating multiple types of item kinds to create new complex item kinds focused on a particular industry or area. For example, we could combine as child elements a photo item of type PhotoKind with a note item of type NoteKind by defining a new aggregate and complex content type that encapsulates such item instances. The schema may further include vertical application domain extensions that are specialized extensions of the AbstractItemKind. These items can be used for a particular vertical and/or community application domains. For example, the StructuredDataKind may include an ApparelKind, an AutoKind, a BookKind, a MovieKind, a MusicKind, a Real-EstateKind (for real estate related content/items), a VideoGameKind and a WineKind.

For each base component (a kind of item in the example shown in FIG. 11), the universal information model also may include elements (for example data structure fields) that allow zero or more views, zero or more actions or zero or more constraints. The views, actions and constraints can be described separately from the schema definition of the item kind such that they are referenced back to the item kind identifier. This way we can ensure that views, actions, and constraints can be associated with the type of the item. Furthermore, views, actions, constraints can be defined at the AbstractItemKind component level such that they are inherited by the base components and other derived types of the base components.

Views

The zero or more views describe ways of displaying instances of the particular base component type (such as an ContactItem kind in the example above). Examples of some views that could be supported for a specific kind of item may include 1) display the item in a list view. E.g., for a contact item display the first_name and last_name elements such that each contact item appears in a single line; or 2) display an expanded view that displays all base component metadata that is applicable to that kind of base component. In both cases the applicable elements are specified as part of the view specification for the particular base component type.

Actions

The zero or more actions may be applicable to processing an item of a given type. Examples of generic actions that can be supported for all kinds of items are: AddItem, UpdateItem, and DeleteItem. Examples of some of the actions that could be supported for an item that is of particular type, for example, a Contact kind (shown in FIG. 4) may include: addMember or importVCard. Each type of action for a specific base component (kind of an item in the item model shown in FIG. 11) can be expressed in terms of the name of the action, parameters that will be passed to the method that will process the action, and the type of return value. For example, the action specification for the importVCard action for the Contact item kind may be:

```
<action name="importVCard" componentAction="contact.ImportVCard"
uiLabel="ImportVCard">
<parameter dataType="stream" name="vcard" uiLabel="VCard file"/>
<returnType>items</returnType>
</action>
```

A second example of an action that can be associated with an item kind are ones which refer to a one or more service providers that can process an item. For example, a photo item may have PrintAction that is processed by a web-based photo printing service provided by a third-party. Here is an example specification to reference a service provider that can process an action associated with a specific item kind:

```
<xs:complexType name="ItemActionLinkKind">
    <xs:complexContent>
        <xs:extension base="ns:AbstractItemKind">
            <xs:annotation>
                <xs:documentation>
                    This specifies the invocation of a third-party web application or resource over HTTP
                    Protocol. The invocation mechanism and parameters are included in the specification
                    such that the consuming application can compose and invoke the URL at run-time.
</xs:documentation>
            </xs:annotation>
            <xs:sequence>
                <xs:element name="Name" type="xs:string"/>
                <xs:element name="Description" type="xs:string" minOccurs="0"/>
                <xs:element name="ItemKindID" type="xs:string"/>
                <xs:element name="BaseURL" type="xs:anyURI" minOccurs="0"/>
                <xs:element name="InvocationType" type="ns:HttpInvocationType"/>
                <xs:element name="Parameter" type="ns:ItemActionParameter" minOccurs="0"
maxOccurs="unbounded"/>
            </xs:sequence>
            <xs:attribute name="category" type="xs:string" use="optional"/>
        </xs:extension>
    </xs:complexContent>
</xs:complexType>
```

A third example is of an action (associated with an item kind) that is processed by a business process which is invoked by an API.

Constraints

The zero or more constraints may be applicable to items of a given type (i.e., an instance of an item kind in the exemplary universal item information model). The constraints may include type constraints and/or semantic constraints. The type constraints for each child element of an item are part of the XML schema definition. The semantic constraints may be applicable to any or all elements within the item. Furthermore, the semantic constraints express which combinations of item element values are acceptable as possible values within the information system. For example, for an element representing a <PostalCode>, the constraint can limit the data entered by the end user to be numeric even if the type definition of this element is xsd:string type within the XML schema namespace. For an element representing <Phone>, the constraint can limit the data entered to be of a specific format and length. Another example is that of a contact item can not have a child element <Gender> with value equal to “Male” and an another child element <Relationship> with value equal to “Mother”.

The views, actions and constraints may be expressed in data structure specifications outside the item kind definition such that they are referenced (and inherited) via an identifier to the AbstractItemKind component which is the base type of all items, or referenced via an ItemKindID identifier to another base component that is derived from the AbstractItem kind, or referenced via an ItemKindID identifier directly to a particular item kind definition. This way these views, actions and constraints can be applied to an item kind included in the universal item information model.

FIGS. 14A and 14B illustrate an example of a ContactItem kind. The ContactItem kind has the item details and also has examples of the system and user defined tags wherein the system tags are generated by a system that utilizes the universal item information model while the user tags may be generated by the user of the system that uses the universal item information model. Similarly, FIGS. 15A and 15B show a PhotoKind that has the item details (the generic characteristics of the PhotoItem) and both system and user tags. The PhotoKind example also includes a photo and thumbnail that are incorporated into the PhotoKind. Similarly, the BookKind (shown in FIGS. 16A and 16B) includes the item details, the system and user tags and also encapsulates a particular book (“The Haunted House”) along with information about the particular book and the AutoKind (shown in FIGS. 17A and 17B) includes the item details, the system and user tags and also encapsulates a particular car (a “Honda Accord”) along with information about the particular car.

As set forth above, the universal item information model may have vertical application domain extensions that are specialized extensions of the ItemKind. There are multiples ways to extend the Universal Item Information Model to support domain specific needs of a particular class of applications. For example, three techniques can be used to support extensions for vertical application domains and those techniques are:

1) To support specialized extensions needed by a particular domain or use case, for example, a real-estate application, it is possible to extend the existing types of item kinds. As an example, it is possible that the <Note> component (shown in FIG. 4) needs to have additional properties such as a special identifier of the EmployeeID of the real-estate broker as part of the extended <Note> component. Such additional properties can be added for a vertical application domain by extending existing NoteKind XML complex type as follows:

```
<xs:complexType name="RealEstateNoteKind">
    <xs:complexContent>
        <xs:extension base="ns:NoteKind">
            <xs:sequence>
                <xs:element name="EmployeeID" type="xs:string"/>
            </xs:sequence>
        </xs:extension>
    </xs:complexContent>
</xs:complexType>
```

2) Certain application domains may also need to combine existing kinds of content together for specialized complex types, for example, <Note> and <Photo> component may need to be combined for a particular type of aggregated component needed for the real-estate domain.

3) If the above two methods of extensions do not address the needs of a specific domain, it is possible to extend the AbstractItem component to a specialized base type.

The new types of schema components could also be defined in its own XML schema namespace that is dedicated to a particular vertical application domain such that all the general and semantic characteristics and other applicable base component characteristics (if extension carried out from an existing base component type) are inherited by the extension defined within the namespace of the vertical application domain.

FIGS. 18A and 18B illustrate an external content model and FIG. 19 illustrates examples of the content kinds generated using the universal information model. The universal information model provides a model for handling external content. External content typically will be in existing formats that are standardized for media files (for example, .jpeg photo file or .mpeg video file formats), documents produced by various authoring tools (for example, .doc, or .txt or .pdf file formats), or other business documents that are formally defined and used by a community of users via XML-based Web Services (for example using an Item schema component representing an item for sale at Amazon.com or an item that is being auctioned by a seller at eBay.com; or, a Rental item described at some realtor site). The mechanism employed to handle (i.e., allow storage, access and processing of) externally defined content (as shown in FIG. 16A) will be by:

1) Describing the underlying externally defined content using generic meta data description included in the AbstractItemKind component which is applicable to any information item (or content), i.e., both user-defined content and other externally-defined content. Such generic meta-data description for any information item (whether defined externally by a 3$^{rd}$ party or directly and locally as user-defined content) is expressed within the <ItemDetail> element of the AbstractItem component; and 2) Wrapping the externally-defined content into an external content element that can carry any kind of content, i.e., including binary content or other specially formatted content as well as content that have a formalized XML schema definition within a namespace owned or managed by a particular business service entity.

Since external content would be processed as a derived type of AbstractItem kind, any kind of content will have fundamentally identical base type definitions that allow external content created by third parties to be generally processed by a system that uses the information model via a combination of generic AbstractItem handler for common information item processing functions and content-type specific handler to process the underlying format-specific content using a 3$^{rd}$ party specific application library. This approach allows seamless integration of external content which can be “plugged-in” to any system which uses the Universal Item Taxonomy since there is no need to transform the format of the external content. FIG. 9B illustrates an example of the data structure for the Kind that handles the external binary content. The approach of representing an external content kind permits re-use of externally defined content from various sources via a generic meta data expression and processing mechanism (for any kind of external content) which will allow interoperability with existing content service providers and applications that use or generate content in various existing content formats and also make the content into derived type within Universal Item Taxonomy.

FIGS. 20A-20D illustrate further details of the system-managed tag <SysTag> shown in FIG. 13. System-managed tags are used by a unit that stores the cells (a cell server) to automatically categorize an item based on a fixed set of semantic attributes of Time, Person, Location, Category and Rating which are referred to as the system-managed tag types. These system-managed tag types allow the system to extract relevant attributes from any type of item when it is published (i.e., created or inserted into the cell's database) and automatically categorize and map the value of the specific element within the item to a particular system-managed tag type. Hence, the purpose of system-managed tags is to enable searching, querying across a database containing many different types of content such in a way that allows certain common concepts to be accessed via system-managed tag types. This automatic process of semantic categorization is uniformly carried out as part of inserting or updating any type of an item into the database locally managed by a cell. In particular, an example of the data structure for a system-managed tag is shown in FIG. 20A and an example of a model for the system-managed tag is shown in FIG. 20B. Each system-managed tag type may support one or more roles. The roles refer to specific elements within the <ItemDetails> child element within the AbstractItemKind and/or elements within specific base component type (extending the AbstractItemKind) that the item is an instance of. Hence, the roles are used at run-time by the system to extract particular characteristics of an item that can be normalized (or mapped) to specific dimensions, i.e., types of system-level tags. Moreover, the values of these roles can either be determined on-the-fly at run-time by, for example, the XPath references to the actual values within the specific elements that are referenced for the roles or stored explicitly with item instances when they are inserted or published into the information system. Also, the system-managed tag model and structure implies that multiple roles can be specified for a particular type of system-level tag. Finally, the above description related to system-managed tags implies that is applicable in a type-independent way to semantically extract relevant characteristics of any type of items according to well-known system level tag types. The system-managed tags and roles are used to configure indices for each cell's database such that queries made as part of various search sessions directed at a particular cell's database can efficiently retrieve relevant items from the database based on the keywords entered by the user in the search interface. When an object in the database is updated, the indices based on the system-level tags and roles are automatically cleared out and then the system-level tags are regenerated based on the updated information about the object in the database.

FIG. 20C illustrates a general example of system-level tag types along with exemplary set of one or more possible roles and purposes associated with each type of system-managed tag. In particular, for a given kind of item, the system-level tag type Time may define roles that reference the elements <CreationTime> and <ModifiedTime> (in the <ItemDetails> child element defined in the AbstractItemKind). The two roles specified in this example for Time tag type for an item have the purpose of finding an item based on when the item was created or modified. Similarly, the Person system-managed tag type may have roles defined that reference the elements <CreatedBy>, <Source> and <Artist>. The three roles specified in this example for the Person tag type have purposes of finding an item based on who created or owns or sent or published an item; or was the artist mentioned in the item. Similarly, the system-managed tag type Location may have roles defined that reference <WebPage> child element within a specific kind of item's definition (for example, a ContactItem kind), a <CityName> child element within an Address component of a specific kind of item (for example an EventItem kind or ContactItem kind), <Postal-code> child element within an Address component of some specific kind of item, and <Geo-location> element that identifies the (latitude, longitude) of an item. The roles specified in this example for the Location tag type have the purposes of finding an item based on where the item is located on the web or physically. Similarly, the Category system-managed tag type may have roles defined that reference elements <Organization> and <Genre>. The two roles specified in this example for the Category tag type have purposes of finding an item based on the organization affiliated with the item; for example, this may be needed to find the contact item of a friend who works in a particular organization or company, or find an item based on the general concept or classification scheme that is associated with the item that happens to be a book item. Similarly Rating system-managed tag type may have roles defined that reference the elements <Feedback_Rating> or <Movie_Rating> or <Reputation> or <Recommendation>. These roles specified in this example have purposes of finding an item based on ratings that may be associated with an item that are defined by a community of users or a third-party content service provider. FIG. 20D illustrates an example of the system-level tags for the ContactItem kind shown in FIGS. 14A and 14B with the one or more roles and the purpose of each type of system-level tag for the ContactItem Kind shown in FIG. 20D.

As an example, when a contact item is created and inserted into the database of a particular cell server that a user is interacting with over the web, the <PersonName> child element of the ContactItem kind would be employed automatically by the system to generate a set of system-managed tags for the Person tag type with roles of <FirstName>, <LastName>, and <FullName>. The values of these tags can be determined at run-time (using an XPath reference) by the system from the contents of the contact item (i.e., from the <PersonName> element). Once the system-managed tags are determined, the system also creates index entry corresponding to these elements representing roles for the particular type of system-managed tag. In specific implementation example of using the XML Database, such indices are updated in the document container of the XML database associated with the cell where the new item is inserted. Lastly, the roles associated with a particular system-managed tag will be driven by the type of system-level tag and the type of content (i.e., item kind). Thus, for the contact item kind case the following pre-defined set of roles and XPath specifications would be employed at the time the contact item instance is inserted into the database of a given cell:

| System Tag Type | Role/Qualifier | XPath | Purpose |
|---|---|---|---|
| Time | Creation_time | ./ItemDetails/CreationTime | Find by creation time (of the item) |
| Time | Modified_time | ./ItemDetails/LastModified | Find by modified time (of the item) |
| Person | FirstName | ./PersonName/FirstName | Find by first name of a person |
| Person | LastName | ./PersonName/LastName | Find by last name of person |
| Person | FullName | ./PersonName/FirstName & ./PersonName/LastName | Find by fullname (i.e., both first name and last name) of person |
| Person | CreatedBy | ./ItemDetails/CreatedBy | Find by name of person who created the item |
| Person | UpdatedBy | ./ItemDetails/UpdatedBy | Find by name of person who updated the item |
| Category | Organization | ./Organization/Title | Find by the name of the organization that a person is affiliated with |

Hence, contextual information extracted from the item, allows the system to aid in the finding experience of the user by exploiting at run-time system-managed indices that are generated automatically by the system against a standard set of tag types and a pre-defined set of roles corresponding to the set of tag types. Lastly, for the system tags, when an object/item is modified in the data management system, the corresponding system-managed index entries for the item are automatically updated based on the new values of the roles (corresponding to the system-managed tag types) associated with the item/object.

The above has been a description of the pre-defined set of system-managed tag types and the corresponding roles that are applicable to each type of system-managed tag for a given type of item (i.e., content). It is also possible for an administrator of the system to define additional roles for a given type of system-managed tag for a given type of item. For example, we may want to do that to optimize searches for a particular kind of item or for a new kind of item that extends from AbstractItemKind or some other base type from the AbstractItemKind. It is also possible to support new types of system-managed tags that can be generally applicable across various types of items (i.e., content). It should be appreciated that such capabilities will allow the administrator of the data management system to extend the semantic capabilities of the system to support specific types of system-managed tags and their applicable roles.

From above description of the tag model and processing mechanism, it should be appreciated that the system-managed and user generated tags stored with item (via the AbstractItemKind component model) allow the uniform processing of semantic properties extracted from the items which are stored as document instance in the database and permit the data management system to provide searching capabilities wherein the searches can be based on the system and user defined tags consistently. Additionally, it should be appreciated that current keyword based searches to find relevant content available on the internet is limited since keywords may represent from the user's perspective various purposes that are not restricted or qualified by roles (as applied to system-managed tag types). This means that when, for example, a user enters "1974" it could mean the year "1974" or the user's intention could have been to find some information about a location with "1974" representing the numeric part of a street address. The approach described above to semantically extend the XML-based database system that manages items as documents with user-defined and system-managed tags as well as additional semantic properties previously identified (for example, notes that a user can add to an item and which is stored as an integral part of the item via the AbstractItem kind that has a <Notes> child element) allows effective means of characterizing content in a personalized and contextualized manner such that system can take advantage of these across the types of content in a uniform manner. This approach will make it easier and efficient to integrate different types of content and navigate between different types of content since all types of content will be stored in one database instance that is locally controlled by the cell server which functions as an application and content server.

FIG. 21 illustrates further details of the system defined connections shown in FIG. 13. System defined connection allow 1-to-many relationships between a given item X and its associated items {A, B, C, . . . }. The origins of the item X is expected to be over some communication channel, for example an email transmitted over SMTP or a RSS data feed accessed over a transport protocol (for example HTTP or HTTPS). Furthermore, for the given item X there may be one or more associated items that are transmitted with or accessible via item X. For example, in the case of email there may be a photo attachment that can be processed by the data management and subsequently saved as a Photo item (of type PhotoItemKind) in the database of the cell that belongs to the user who received the email. Also, in the case of email there may be some contact information or web links embedded in the body of the email which when processed can be extracted as a contact item kind or as link item kind respectively. As another example, in the case of RSS data feed there may be related set of content that can be parsed as corresponding item kinds and stored in the database of the cell that belongs to the user who subscribed to the RSS data feed. It is desirable that in such cases where the underlying content X has distinct set of content {A, B, C, . . . } included with it or content {A, B, C, . . . } that can be accessed via it, the data management system which processes the content and subsequently stores it should preserve the relationships between the content such that when we access original content X the user has means to easily access the content connected to X, i.e., {A, B, C, . . . }. This requires that the system explicitly capture such connections between items at the time the items are persisted in the database of a cell using the concept of system defined connections such that this information be available with the connected items. Furthermore, such system defined connections can be between items of any types as defined in the Universal Item Information Model (UIIM) and models 1-to-many relationships using schema component defined within the Universal Item Description Language (UIDL). As shown in FIG. 6, each system defined connection may include a <SysConnID> element and a <Source> element which are defined as child elements of the <ItemDetails> child element of the AbstractItemKind component type. Hence, all types of items that extend from AbstractItemKind can explicitly record the system connections with one or more items. The <SysConnID> element describes a unique identifier for each system defined connection which is set by the system in the parent item X and all the child items {A, B, C, . . . } which are system connected to the parent item. The <Source> element could describe an email address or other unique identifier which is used to identify the source of the parent item wherein all items below the parent (i.e., contained child items such as attachments in emails) include the <Source> element. For example, for an email message, the email address value representing the source can be determined from the contact item that the system generates from the "From:" field in the email header. The format of the source will be a URI of the following format [Transport_Type]:[ID]. The [Transport_Type] component could describe an identifier for some communication medium to push or pull content; for example acceptable values for Transport_Type could be {Email, RSS, . . . }. The [ID] component could describe an identifier for the source that generated or published the content which implicitly has multiple items connected to it; for example, an email address of the user who sent the email could be the [ID] of the source, or username of the source, or URL where the RSS data feed is available, etc.

Hence, to preserve the relationships between items when a particular content is processed and subsequently stored in the database of a particular cell, the system will automatically add the <SystemConnection> elements <SysConnID> and <Source> in all child items {A, B, C, . . . } connected to the parent item X. Similarly, the system will also automatically add in the parent item X the <SystemConnection> elements <SysConnID> and <Source>. This will allow user to subsequently retrieve the parent item X such that the system can on-demand facilitate the retrieval of the child items {A, B, C, . . . } via system connection links. Likewise, this will also allow user to subsequently retrieve the child items {A, B, C, . . . } such that the system can on-demand facilitate the retrieval of the parent item X via system connection links.

FIGS. 22A and 22B illustrate further details of the user defined connections shown in FIG. 13. The user defined connections permit a user to relate a given item with one or more related items in an information management system such that the connections between the items are implemented as two-way links specified in the item instance. Hence, the user defined connections allow capturing of 1-to-1 relationships between two items of any type. FIG. 22A illustrates an example of the data structure for the related item type (which is the schema component for the user defined connection within the <ItemDetails> child element of the AbstractItemKind). As shown in FIG. 22A (and in the example shown in FIG. 14A), each related item has a URI that identifies the connected item, a KindID that identifies the kind of item on the other end, and a relation type element that defines the type of relationship by which the item containing the connection is related to the item at the other end of the connection.

The creation of an item-specific relation from Item A to Item B implies that two links are created (i.e., URIs being instantiated for two-way links), one from A to B and the other from B to A, such that the connection from A to B results in the update of Item A in the database and the connection from B to A results in the update of Item B in the database. The relation URIs are then included as part of the XML data associated with the items as shown in FIG. 7A. The related item links are actionable since a user can click on a link to be transported instantaneously to the relevant item or display a list view of the connected item(s). Hence, such user defined connections is an advancement of the current simple URL links used on the web in following three ways: (a) user can define connection between the items that are 2-way links, i.e., user can browse from item A to B using the link present in item A; or given item B browse from item B to A using the link present in itemB; (b) the connection between the item is typed, i.e., user can know what type of item is connected on the other end rather than the current web link scheme which is just a web page; (c) actionable item which can be acted on locally, i.e., we can navigate from item A to item B or from item B to item A via the 2-way links as if the connected items were present locally (using the user defined connection mechanism).

Query Structure and Language

The Situated Query Language of the data management system will be described in the context of the exemplary implementation that uses the Universal Item Information Model (UIIM) as the underlying information model for the data management system. However, the data management system and method can be used with any information model. The query language can be used to formulate and capture "situated queries" that can be executed in a particular context, for example a query can be processed that returns information in context of a specified cell where a cell organizes a set of applications together with a database for those applications. This approach of specifying a query is different from an SQL query. SQL queries are formulated "outside" the relational database and have no context beyond the database as a whole. On the other hand, every Situated Query Language query is executed in the context of some cell. A query can access various different contexts via a scoping qualifier which is used to specify the cells where the desired information items of interest may be present. Hence, situated queries allow flexible search sessions to discover relevant items in an absolutely and/or relatively defined set of sources such that the underlying meaning of the query remains the same as we shift the context of the query. For example, "My Friend's music" has a different result but the same meaning for me than for you. Moreover, such queries will be very useful to interactively search within different information bases and also allow integration of relevant content in a purposeful way. Such queries can also be defined and employed in the simple creation of applications which can be used in multiple contexts (with the same meaning) without rewrites.

Furthermore, the query language and model described can leverage the standard XQuery Language and operates on any item that is modeled using Universal Item Information Model (UIIM) and defined using the XML-based Universal Item Description Language (UIDL). The advantages of situated query language are: (a) the queries allow context to be addressed absolutely and/or relatively to the current cell; (b) queries take place "in context" as opposed to outside of the database; this means that applications developed in the context of given cell or a given account can be used with the same meaning in other cells or other accounts without change; this is essential for sharing of user constructed applications and the resulting network effects of sharing of user constructed applications; (c) the query model takes advantage of tagging, connections and user account (i.e., membership) in order to build the most general framework for access to content.

The query structure for the data management system will be of the following: Query [Type] [Scope] [PageSize] [MaxSize] [Expression] wherein each query has following required top-level components [Type], [Scope] and an [Expression] component and following optional top-level components: [PageSize] and [MaxSize]. The [Expression] component comprises the sub-components <conditions>, <kind>, <orderby>, <filter>, <connect>, <tag>, <groupby> and <count>.

FIG. 26 illustrates the specification of a situated query having a scope declaration (sc) and a query expression (expr) and the query is evaluated related to a cell (c). The specification of the operation scope (sc,c) has inputs that are the scope declaration sc and a cell instance c and the output returns a set of cells which have the value of the scope declaration sc. The specification of the operation evaluation (expr, c) has inputs that are the expression and the cell instance and the output returns all items in the one or more cells (identified by the scope declaration) that match the expression. The result of the query <sc,expr> evaluated at cell c is shown in FIG. 19.

The [Type] of the query specifies the general type of content that the query intended to return. For example, the [Type] can be used to express that a query is for cells or items or tags or user accounts or application components or mixed set of resources (using a union operator).

The [Scope] is a formula determining a set of cells from which the result set will be generated. Hence, the scope of the query enables targeted search to take place. For example, the scope may be 'THIS cell'; or 'My Photo Cell'; or 'All Cells owned by My Account'; or 'All cells to which my account belongs'; or 'All cells belonging to my friends'; or 'All cells belonging to contacts that have been tagged "friends" or 'music"', etc. Hence, typically, the query may be processed in two stages: first a computation of the scope yielding a set of cells that are relevant to the query; and second, the computation of the expression part of the query within each of those cells with the query result being the union of the results of evaluating [Expression] for each cell in the result of evaluating [Scope]. The format of the [Scope] specification may consist of 1) scope actions and/or 2) two or more scope actions combined together in various ways using set operations wherein the set operations may include "union" to aggregate cells, "collect" to chain one scope action with another scope action and other known set operations.

The scope actions are all evaluated in the in context of a cell instance such that we can qualify the results of the query (which in the most common case is the information item instances for which we are searching). The expression of the scope actions may include any of the following methods: getCellOwnerAction to retrieve information about the owner of cell from the database; getCellMembersAction to retrieve information about all members of the specified cell from the database; getCellsOwnedByAccountAction to retrieve information about all the web presences that a user has access to as specified in the database; getCellsWhoseMemberIsAccountAction to retrieve information for all the web presences that a user has access to as specified by the database; FilterByTag to filter provided objects (for example, cells and accounts) based on tag value such that the filter functions as a predicate which is evaluated in terms of the conditions being true or false. The FilterByTag method will be very useful in situations where a user account is tagged in a particular way. For example, a private tag "friend" may be defined by a user for a particular account. Such tags will be private tags such that only the user who defined the private tag can see and apply it as a filter using the FilterByTag method. Furthermore, the FilterByTag can be used as a scope action to find cells belonging to particular accounts that have been tagged with a private tag. For example, the account of a particular user may be tagged privately as "friend" by a user that only the user can see and apply as a filter as part of subsequent query processing. In this way the user X can tag the contact item for the user Y as "friend" which may be public tag (on the contact item) and also tag the account of the same user Y as "friend" that is private tag such that the scope action can filter and search for cells that are belonging to accounts that are known by the user X to be of his or her friends using the private tags at the account level. This implies that web accessible content belonging to a particular contact that has been privately tagged (for example, with private tag "friend" at the account level) could also be filtered using the FilterByTag method.

An example of the scope action specification is the following:

```
<scope xmlns=http://www.ludilabs.com/al1/definition>
    <op name=scope.GetCellsOwnedByAccount>${cell.owner}</op>
</scope>
```

Another example of scope action specification which involves combining cell instances owned by a user with the cell instances that the user is a member of:

```
<scope xmlns=http://www.ludilabs.com/al1/definition>
        <op name=union>
                <op name=scope.GetCellsOwnedByAccount>${cell.owner}</op>
                    <op name=scope.GetCellsWhoseMemberIsAccount>${cell.owner}</op>
          </op>
    </scope>
```

The [PageSize] of the query can optionally be used to specify the number of items (or objects) in the page of data to be returned in the query result such that the calling application can control the size of the result as a small subset within pages.

The [MaxSize] of the query can optionally be used to specify the maximum number of objects (for example items) to be returned in the query result.

The [Expression] of the query is used to specify the criteria of finding and returning information items stored in an application database (i.e., specific database containers associated with cell instances). The format of the expression may consist of one or more of the following components: <conditions>, <kind>, <orderby>, <filter>, <connect>, <tag>, <groupby> and <count>.

The <condition> specified for the query expression are dependent on [Type] of query. For example, if [Type]='Account', the query conditions would be limited to returning list of user account or member list.

The <kind> is used to specify the type of content the query will be returning, i.e., the query results will be of the type of content identified by the <kind> identifier. For example, the query will be processed by a cell that has a database of items of the <kind> equal to 'PhotoItem' or a 'ContactItem'.

The <orderby> component is used to specify the XPath value to reference the child element within the item such that the query results can be ordered by the specific child element within item instances (in the result of the query). The <orderby> component will also have the <direction> attribute that specifies whether the results are ordered in 'ascending' or 'descending' order, for example in terms of the last modified date of the item instance.

The <filter> component is used to specify the XPath value to reference the child element such that results of the query can be filtered by a specific child-element within the returned item instances.

The <connect> component is used to specify that the returned items should be connected to (i.e., related to) the item referenced by the specified ItemID (which uniquely identifies an item instance).

The <tag> component is used to specify that the returned item instances have a specific tag value which may be in either the user-defined tag or system-managed tag.

The <groupby> element can optionally be used to specify the format of the results of the query, i.e., how the returned information or items should be grouped, for example, using one or more key values in particular elements within an item to group the data in the query result.

The <count> element can optionally be used to specify the number of items to be returned in the query result.

Furthermore two or more sub-expressions may be combined using the <join> operation element with the <type> attribute used to specify whether the sub-expressions will be combined using the logical operators such as 'or', 'and', and 'not'. There can be multiple joined sub-expressions using the <join> operation element.

The following is an example of a query expression that filters for items which are contact items and have LastName (in contact item) having value equal to "Hayes" or tagged with the keyword value of "cool" such that the query results are sorted in order by LastName and then FirstName:

```
<expression xmlns=\"urn:com:sharefare:webos:basecomponents-1.0\">
    <join type=\"or\">
```

-continued

```
        <filter>
            /ludi:contactItemKind/ludi:PersonName/ludi:LastName=\"Hayes\"
        </filter>
        <tag>
            cool
        </tag>
        </join>
        <kind>
            Contact
        </kind>
        <orderby direction=\"asc\\">
            /ludi:contactItemKind/ludi:PersonName/ludi:LastName
        </orderby>
        <orderby direction=\"asc\">
            /ludi:contactItemKind/ludi:PersonName/ludi:FirstName
            </orderby>
</expression>;
```

Furthermore, here is the sample Java code for creating the application-level query which carries out the query within the cell that is the context for the query:

```
// prepare query
    Query q = queryService.createQuery(
        "<query><scope type=\"cell\" value=\"${this.cell}\"/>" +
        "<expression><kind>" + kindID +
        "</kind></expression></query>");
```

FIG. 23 illustrates an example of an application component definition for a ContactComponent which includes a query to retrieve a ContactItem. The ContactItem includes a Contacts ItemList and a ConnectedContacts wherein both include a query as shown in FIG. 23. FIG. 24A illustrates a set of run-time code for the query to fetch all of the Contact items in a sorted order using the known W3C XQuery's FLWOR (for-let-where-orderby-return) expression. The XQuery is executed by the XML Database which returns the contact items, as an ordered list based on person's last name, from a DB container (associated with the cell) which has a collection of XML document-style item instances. FIG. 24B illustrates a set of code for the query to fetch all of the connected items for a given contact item (identified by an itemID) and for a given cell. This code is generated by the query processor. To further illustrate the query language of the system, several additional examples of cell-level queries are provided below.

In a first example, the query (which is formulated in this example using the provided Java code sample) returns all that are of type ContentKind or LinkKind such that they are present in cells that either the specified user owns or the specified user is a member of the cells:

```
String queryXml = "<query xmlns=\"http://www.ludilabs.com/al1/definition\">" +
" <scope>" +
"       <op name=\"union\">" +
"             <op name=\"scope.GetCellsOwnedByAccount\">${cell.owner}</op>" +
"             <op name=\"scope.GetCellsWhoseMemberIsAccount\">${cell.owner}</op>" +
"       </op>" +
" </scope>" +
" <expression>" +
"       <jointype=\"or\">" +
"             <kind>ContactItem</kind>" +
"             <kind>LinkItem</kind>" +
"       </join>" +
" </expression>" +
"</query>";
```

In the second example, the query returns all items that are of type ContactItemKind and filters the result using the <FirstName> of the contact instance such that the specified user owns or is member of the underlying cell where the item is present:

```
String queryXml = "<query xmlns=\"http://www.ludilabs.com/al1/definition\">" +
" <scope>" +
"          <op name=\"union\">" +
"               <op name=\"scope.GetCellsOwnedByAccount\">${cell.owner}</op>" +
"               <op name=\"scope.GetCellsWhoseMemberIsAccount\">${cell.owner}</op>" +
"          </op>" +
" </scope>" +
" <expression>" +
"          <kind>ContactItem</kind>" +
"          <filter>//ludi:FirstName=\"" + firstName + "\"</filter>" +
" </expression>" +
"</query>";
```

In a third example, the query returns all items that have the specified URI link (referencing specific content) such that the specified user owns or is member of the underlying cell where the contact is present:

```
String queryXml = "<query xmlns=\"http://www.ludilabs.com/al1/definition\">" +
" <scope>" +
"          <op name=\"union\">" +
"               <op name=\"scope.GetCellsOwnedByAccount\">${cell.owner}</op>" +
"               <op name=\"scope.GetCellsWhoseMemberIsAccount\">${cell.owner}</op>" +
"          </op>" +
" </scope>" +
" <expression>" +
"          <filter>//ludi:Content=\"" + url + "\"</filter>" +
" </expression>" +
"</query>";
```

In a fourth example, the query returns all items that are connected to the specified item instance such that the specified user owns or is member of the underlying cell where the item is present:

```
String queryXml = "<query xmlns=\"http://www.ludilabs.com/al1/definition\">"+
" <scope>" +
"          <op name=\"union\">" +
"               <op name=\"scope.GetCellsOwnedByAccount\">${cell.owner}</op>" +
"               <op name=\"scope.GetCellsWhoseMemberIsAccount\">${cell.owner}</op>" +
"          </op>" +
" </scope>" +
" <expression>" +
"          <connect>" + item.getId( ) + "</connect>" +
" </expression>" +
"</query>";
```

In a fifth example, the query returns all items that are of specified Item kinds (identified as Item KindIDs) and connected to specified item instances and including specific system- or user-specified tags and sort the results in descending order by the last modified date such that the specified user owns or is member of the underlying cell where the item is present:

```
String queryXml = "<query xmlns=\"http://www.ludilabs.com/al1/definition\">" +
" <scope>" +
"          <op name=\"union\">" +
"               <op name=\"scope.GetCellsOwnedByAccount\">${cell.owner}</op>" +
"               <op name=\"scope.GetCellsWhoseMemberIsAccount\">${cell.owner}</op>" +
"          </op>" +
" </scope>" +
```

-continued

```
    " <expression>" +
    (kind == null ? "" : "<kind>" + kind + "</kind>") +
    (tag == null ? "" : "<tag>" + tag + "</tag>") +
    (connect == null ? "" : "<connect>" + connect + "</connect>") +
    (orderby == null ? "" : "<orderby direction=\"descending\">" + orderby + "</orderby>")
+
    " </expression>" +
    "</query>";
```

In an sixth example, the query returns all items that are of specified ItemKinds (identified as Item KindIDs) and connected to the specified item instance and including specific system-managed tag of specified type and with specified role and sort the results in descending order by the last modified date such that the specified user owns or is member of the underlying cell where the item is present:

```
    String queryXml = "<query xmlns=\"http://www.ludilabs.com/al1/definition\">" +
    " <scope>" +
    "         <op name=\"union\">" +
    "              <op name=\"scope.GetCellsOwnedByAccount\">${cell.owner}</op>" +
    "              <op name=\"scope.GetCellsWhoseMemberIsAccount\">${cell.owner}</op>" +
    "         </op>" +
    " </scope>" +
    " <expression>" +
    (kind == null ? "" : "<kind>" + kind + "</kind>") +
    (tag == null ? "" : "<tag type=\"SystemTagType\" role=\"" + role + "\" name=\"" +
category + "\">" + tag + "</tag>") +
    (connect == null ? "" : "<connect>" + connect + "</connect>") +
    (orderby == null ? "" : "<orderby direction=\"descending\">" + orderby + "</orderby>")
    " </expression>" +
    "</query>";
```

In addition to the queries, the tags permit items to be sorted and filtered. The items can be sorted by basic item attributes (as defined in the AbstractItem Kind definition) such as source (originator), creation date, date modified, subject, and system-managed tags such as person (for example, the item creator), location, time, category, kinds, ratings and other general tags, i.e., user-defined tags. The filtering may be done based on the tags, such as the Person tag, the Location tag, the Time tag, the Category tag, the Kinds tag, the Rating tag, the user-defined tag or all of the tags.

Query Design for Retrieving Connected Items

Figure 25:
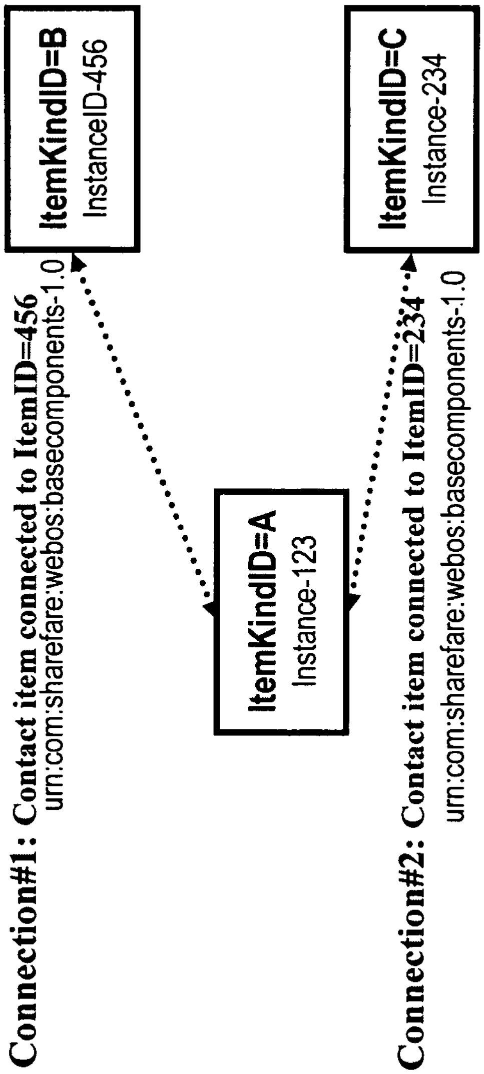
FIG. 25 illustrates a conceptual model of user-defined connection from a given an item to a set of related items user-defined connection model.

FIG. 25 illustrates a connection model of the data management system. The item connection model will be described in the context of the Universal Item Information Model (UIIM) of the exemplary embodiment of the data management system. In the item connection model, an item may refer to a related item via a connection relationship model where item relationships are specified by ns:RelatedItemType that describes an Item Reference that is a URI and a relation type that is a user-defined tag to describe the type of relation between the two item instances. As shown in the example shown in FIG. 22, two connections/relationships are shown along with the ns:RelatedItemType data structure. FIGS. 14A and 14B also illustrate a ContentItem type that has the connections using the RelatedItemType data structure. The connections and relationships permit the data management system to provide one or more zoom-levels to access an item instance. When an item instance is accessed via a query and actions, each instance may have a default zoom-level for the particular ItemKind. The Zoom levels may include Zoom Level 0 (where metadata only is retrieved along with any encapsulated data components), Zoom Level 1 (where metadata and all immediately related item instances are retrieved), Zoom Level 2 (where metadata and any specific related items specified by the user are retrieved, Zoom Level 3 (where no metadata, but all related items are retrieved) and Zoom Level 4 (where no metadata, but all specific related items are retrieved).

As discussed earlier, the connections may be stored in a connection element for each item and may be either system generated or user generated. The user generated connections permit purpose-based and object-oriented, two-way linking of related items. Examples of system generated connections for a contact item are shown in FIG. 14A above. For the system generated connections, when a piece of content originates from a transport-oriented source (e.g., email), the content is parsed into its applicable item kinds that may include, for an email message for example: attachments, sender information (parsed from the 'From:' header field of the email) and the message body including Links and Embedded Photos. For the user generated connections, a user can connect any item of any type with an item of any other item type wherein an item can be connected to n number of other items. Furthermore, in the data management system only persons authorized to work with a particular item can create connections from/to that item.

Once items are connected to each other, the items can be viewed by a "Connected View" feature of the data management system. Once the items are connected, the data management system permits queries to retrieve the related items. Hence, for the example of where the user has selected an item that is of any type and the user needs to see all the connected items to the selected item instance, the query will return for a given cell (a) all system defined connections (i.e., all items that came in with the selected item), (b) all items that are first level of user defined connections, (c) and the contact that sent the item. Furthermore, the connected items would be accessed by the data management system using the ItemID of the connected item which would be the value set in the <ItemReference> element within the <RelatedItem> child element of the base type AbstractItemKind.

As another example, the query for retrieving related items wherein the user has selected a contact item and needs to see all items connected to the selected contact item instance, the query needs to fetch all the items from the contact and show them as related items to the Contact item selected. The query results returned for a given cell in the data management system will include (a) contact (which should correspond to the <Source> element in the related items), (b) all items sent from that contact (for example, emails, photos, and any other type of items), (c) all items connected to the selected contact item. Similar to previous example, the ItemID (which is set in the <ItemReference> element within the <RelatedItem> child element of the base type AbstractItemKind) will be used to retrieve the connected items.

As another example, the query for retrieving related items wherein the item is of type EmailMessageKind, i.e., user has selected an email and user wants to see connected item to the selected email. The query results returned for a given cell in the data management system will include (a) the selected email item, (b) all items that are system defined to the email, i.e., all items that were originally to the email and/or parsed from the message body (for example, a web URL link or an email address embedded in the email message body), and (c) the contact item for the person who sent the message (i.e., the 'From:' field of the email header). Similar to previous examples, the ItemID (which is set in the <ItemReference> element within the <RelatedItem> child element of the base type AbstractItemKind) will be used to retrieve the connected items.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. An application specification system, comprising:

a computing device having a processor and memory wherein the processor implements an information management system having a storage unit;

the storage unit having an application definition language that has an XML schema definition that defines computational and data access aspects of an application, the application hosting a web presence on the computing device, the XML schema definition of the application definition language provides a consistent definition of the computational and data access aspects of an application used to develop a new web application running on a third party system;

the storage unit having one or more cells with each cell having one or more components wherein each component defines computational and data access aspects of an application and one or more presentations wherein each presentation defines a user interface for a particular application, each cell further comprising one or more lines of XML code, each component further comprising one or more lines of XML code, each web presence further comprising one or more lines of XML code, each component further comprises a widget that comprises one or more lines of XML code and component further comprises an action item that comprises one or more lines of XML code;

wherein the web presence performs one or more applications that is instantiated from a cell instance that has one or more components, one or more presentations and content associated with the cell instance, the one or more applications of the web presence are defined by the application definition language and one or more components of the cell instance and the user interface of the one or more applications are defined by the one or more presentations of the cell instance wherein the one or more applications are configured to operate on the content associated with the cell instance; and wherein the web presence is one of a web site, one or more web pages and a web service.

2. The system of claim 1, wherein each component further comprises a variable associated with the component wherein the variable is recalculated automatically, wherein the variable further comprises a formula portion that specifies a value of the variable and wherein the formula further comprises a situated query to retrieve data from the same cell or from other cells and a context for the situated query is specified by the particular cell or within the situated query.

3. The system of claim 1, wherein each object is based on an abstract base type object having one or more general characteristics elements of an object and one or more semantic property elements, and a plurality of base components, each base component being a child of the abstract base type object and inheriting the one or more general characteristics, each base component being a container item kind that describes a type of object and encapsulates the particular type of object wherein each type of object associated with the system is represented by the abstract base type object and one of the base components.

4. The system of claim 3, wherein the one or more general characteristic elements of an object further comprises a LogicalServerID element, a ContentSize element, a CreatedBy element, a CreationTime element, an ItemID element, a KindID element, a LastModified element, a Title element, or an UpdatedBy element.

5. The system of claim 1 further comprising a plurality of aggregated components wherein each aggregated component further comprises one or more base components that store information about a content having one or more types of objects.

6. The system of claim 1 further comprising a new base component for a new type of object, the new base component describing the new type of object and encapsulating the underlying content of the new type of object within a generic content element wherein the new type of object is represented by the new base component.

7. The system of claim 1, wherein the plurality of base components further comprises a vertical application domain item based on a base component that has a vertical application domain semantic property element.

8. The system of claim 1, wherein the abstract base type object further comprises a views element, an actions element and a constraints element wherein the views element describes zero or more display types associated with the abstract base type object, the actions element describes zero or more actions associated with the abstract base type object and the constraints element describes zero or more constraints associated with the abstract base type object.

9. A method for specifying an application stored in a storage unit, the method comprising:

providing an application definition language that has an XML schema definition that defines computational and data access aspects of an application, the application hosting a web presence on a computing device, the XML schema definition of the application definition language provides a consistent definition of the computational and data access aspects of an application used to develop a new web application running on a third party system;

providing one or more cells with each cell having one or more components wherein each component defines the computational and data access aspects of an application and one or more presentations wherein each presentation defines a user interface for a particular application, each cell further comprising one or more lines of XML code, each component further comprising one or more lines of XML code, each web presence further comprising one or more lines of XML code, each component further comprises a widget that comprises one or more lines of XML code and component further comprises an action item that comprises one or more lines of XML code;

providing a web presence for performing one or more applications is instantiated from a cell instance that has one or more components, one or more presentations and content associated with the cell instance, the one or more applications of the web presence are defined by the application definition language and one or more components of the cell instance and the user interface of the one or more applications are defined by the one or more presentations of the cell instance wherein the one or more applications are configured to operate on the content associated with the cell instance; and wherein the web presence is one of a web site, one or more web pages and a web service.

10. The method of claim 9, wherein each component further comprises a variable associated with the component wherein the variable is recalculated automatically, wherein the variable further comprises a formula portion that specifies a value of the variable and wherein the formula further comprises a situated query to retrieve data from the same cell or from other cells and a context for the situated query is specified by the particular cell or within the situated query.

11. The method of claim 9, wherein each object is based on an abstract base type object having one or more general characteristics elements of an object and one or more semantic property elements, and a plurality of base components, each base component being a child of the abstract base type object and inheriting the one or more general characteristics, each base component being a container item kind that describes a type of object and encapsulates the particular type of object wherein each type of object associated with the system is represented by the abstract base type object and one of the base components.

12. The method of claim 11, wherein the one or more general characteristic elements of an object further comprises a LogicalServerID element, a ContentSize element, a CreatedBy element, a CreationTime element, an ItemID element, a KindID element, a LastModified element, a Title element, or an UpdatedBy element.

13. The method of claim 9 further comprising a plurality of aggregated components wherein each aggregated component further comprises one or more base components that store information about a content having one or more types of objects.

14. The method of claim 9 further comprising a new base component for a new type of object, the new base component describing the new type of object and encapsulating the underlying content of the new type of object within a generic content element wherein the new type of object is represented by the new base component.

15. The method of claim 9, wherein the plurality of base components further comprises a vertical application domain item based on a base component that has a vertical application domain semantic property element.

16. The method of claim 9, wherein the abstract base type object further comprises a views element, an actions element and a constraints element wherein the views element describes zero or more display types associated with the abstract base type object, the actions element describes zero or more actions associated with the abstract base type object and the constraints element describes zero or more constraints associated with the abstract base type object.

* * * * *